United States Patent
Feghali et al.

(10) Patent No.: US 10,924,591 B2
(45) Date of Patent: Feb. 16, 2021

(54) LOW-LATENCY LINK COMPRESSION SCHEMES

(71) Applicant: INTEL CORPORATION, Santa Clara, CA (US)

(72) Inventors: Wajdi Feghali, Boston, MA (US); Vinodh Gopal, Westborough, MA (US); Kirk Yap, Westborough, MA (US); Sean Gulley, Sudbury, MA (US); Simon Peffers, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 16/014,690

(22) Filed: Jun. 21, 2018

(65) Prior Publication Data

US 2019/0045031 A1 Feb. 7, 2019

(51) Int. Cl.
  *H04L 29/06* (2006.01)
  *H04L 12/863* (2013.01)

(52) U.S. Cl.
  CPC ............ *H04L 69/04* (2013.01); *H04L 47/62* (2013.01)

(58) Field of Classification Search
  CPC .............................. H04L 47/62; H04L 69/04
  See application file for complete search history.

(56) References Cited

U.S. PATENT DOCUMENTS

| | | | | |
|---|---|---|---|---|
| 8,665,722 | B2* | 3/2014 | Szymanski | H04L 47/30 370/235 |
| 9,470,756 | B1* | 10/2016 | Wilcox | G01R 31/318547 |
| 9,973,215 | B1* | 5/2018 | Sivakumar | H04L 69/14 |
| 2005/0036502 | A1* | 2/2005 | Blanc | H04L 49/3036 370/412 |
| 2007/0083491 | A1* | 4/2007 | Walmsley | G06F 21/608 |
| 2007/0201497 | A1* | 8/2007 | Krishnamurthy | H04L 47/24 370/412 |
| 2010/0232721 | A1* | 9/2010 | Yang | H04N 19/172 382/239 |

(Continued)

*Primary Examiner* — Mehmood B. Khan
(74) *Attorney, Agent, or Firm* — Law Office of R. Alan Burnett, P.S

(57) ABSTRACT

Methods and apparatus for low-latency link compression schemes. Under the schemes, selected packets or messages are dynamically selected for compression in view of current transmit queue levels. The latency incurred during compression and decompression is not added to the data-path, but sits on the side of the transmit queue. The system monitors the queue depth and, accordingly, initiates compression jobs based on the depth. Different compression levels may be dynamically selected and used based on queue depth. Under various schemes, either packets or messages are enqueued in the transmit queue or pointers to such packets and messages are enqueued. Additionally, packets/message may be compressed prior to being enqueued, or after being enqueued, wherein an original uncompressed packet is replaced with a compressed packet. Compressed and uncompressed packets may be stored in queues or buffers and transmitted using a different numbers of transmit cycles based on their compression ratios. The schemes may be implemented to improve the effective bandwidth of various types of links, including serial links, bus-type links, and socket-to-socket links in multi-socket systems.

27 Claims, 16 Drawing Sheets

(56) References Cited

U.S. PATENT DOCUMENTS

| | | | |
|---|---|---|---|
| 2013/0107891 A1* | 5/2013 | Ziegler | H04L 12/4633 |
| | | | 370/429 |
| 2014/0139513 A1* | 5/2014 | Mammou | G06T 1/20 |
| | | | 345/419 |
| 2016/0087647 A1* | 3/2016 | Fenney | H03M 7/6023 |
| | | | 341/67 |
| 2016/0336960 A1* | 11/2016 | Henry | H03M 7/42 |
| 2017/0060467 A1* | 3/2017 | Leo | G06F 3/0638 |
| 2017/0127071 A1* | 5/2017 | Sinha | H04N 19/436 |
| 2018/0109357 A1* | 4/2018 | Sung | H04L 45/28 |
| 2019/0014055 A1* | 1/2019 | Gupta | H04L 47/50 |
| 2019/0034334 A1* | 1/2019 | Arelakis | G06F 3/0673 |
| 2019/0095236 A1* | 3/2019 | Felter | G06F 9/46 |

* cited by examiner

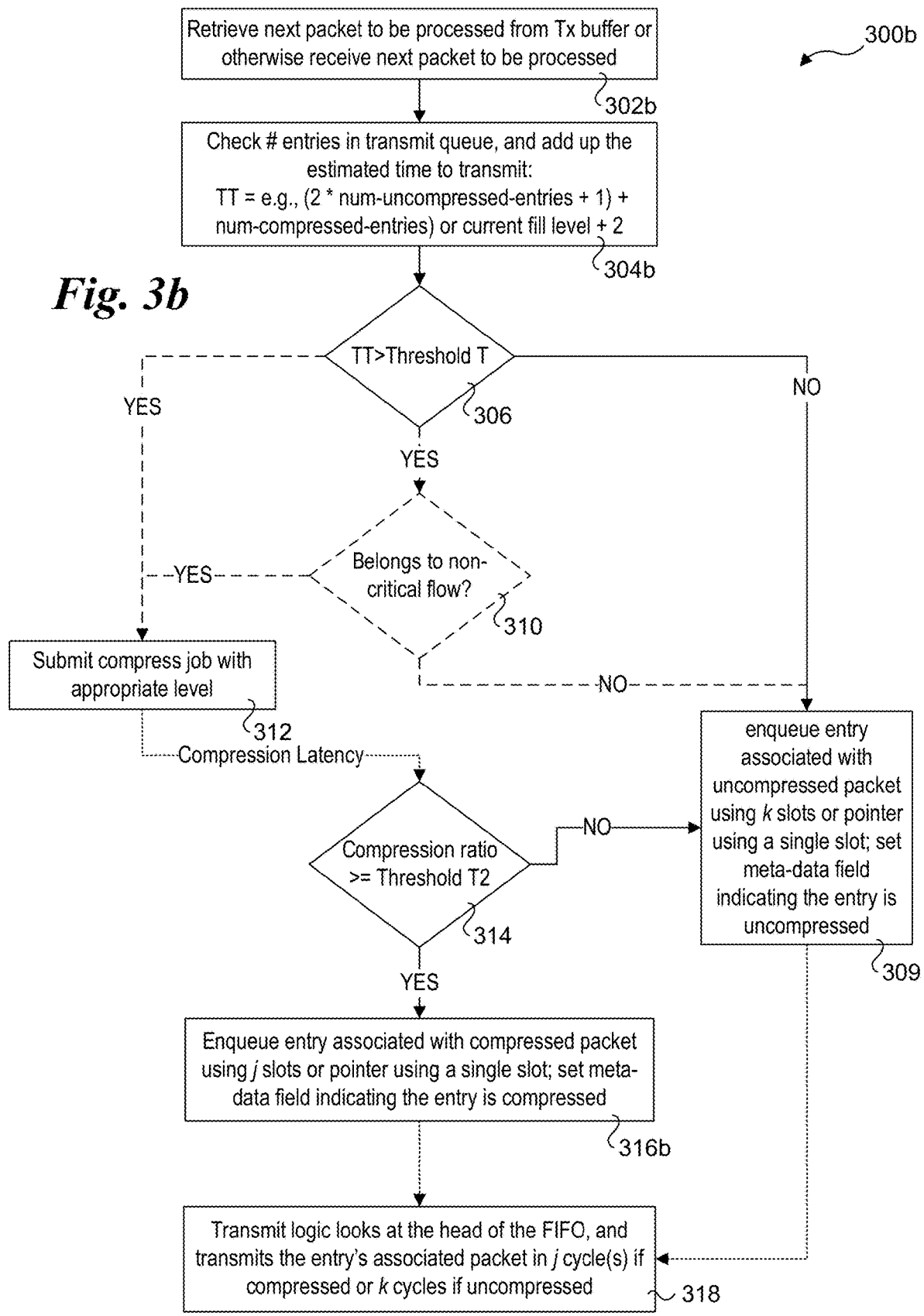

LOW-LATENCY LINK COMPRESSION SCHEMES

BACKGROUND INFORMATION

As processors and networks get ever more faster, the transfer of data across interconnects becomes increasingly important. For example, communication between components in a processor, such as processor cores, memory controllers, input/output (IO) interfaces, involves transfer of data over high speed interconnects, which historically employed buses but today generally employs high-speed serial links. In addition to data communications within processors, there are also high-speed interconnects between processors and other system components, including IO devices such as network interfaces and host controller adapters. For multi-processor systems, such as servers employing Non-Uniform Memory Access (NUMA) architectures, there are high-speed interconnects used to connect the processors that are referred to as socket-to-socket interconnects.

Problems may arise under which the transfer rate supported by an IO or socket-to-socket interconnect (i.e., the interconnect bandwidth) can't keep up with the bandwidth requirements of data producers and/or consumers in the system. This is generally addressed by using various transmit and receive buffers and/or queues at the interfaces to the interconnect links; however, once the buffers/queues get filled, the interconnect links become bottlenecks, reducing system performance.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3b is a flowchart illustrating operations and logic for implementing low-latency link compression schemes under which packets or messages are dynamically selected for compression prior to being enqueued in a transmit queue, according to one embodiment;

FIGS. 7, 7a, and 7b are multi-socket system architecture diagrams illustrating selected aspects of processors in a multi-socket system employing ring interconnects and including socket-to-socket link interfaces implementing link architectures according to the embodiments shown in FIGS. 4, 4a, 4b, and 4c, wherein FIG. 7 depicts a first view of the architecture including details of a pair of processors in sockets 2 and 3, FIG. 7a illustrates a reduced level of detail for each of the processors in sockets 0, 1, 2 and 3, and FIG. 7b shows an augmented view of FIG. 7a depicting implementation of the link architectures of FIGS. 4, 4a, 4b, and 4c for the socket-to-socket links and link interfaces in the multi-socket system.

DETAILED DESCRIPTION

Figure 1:
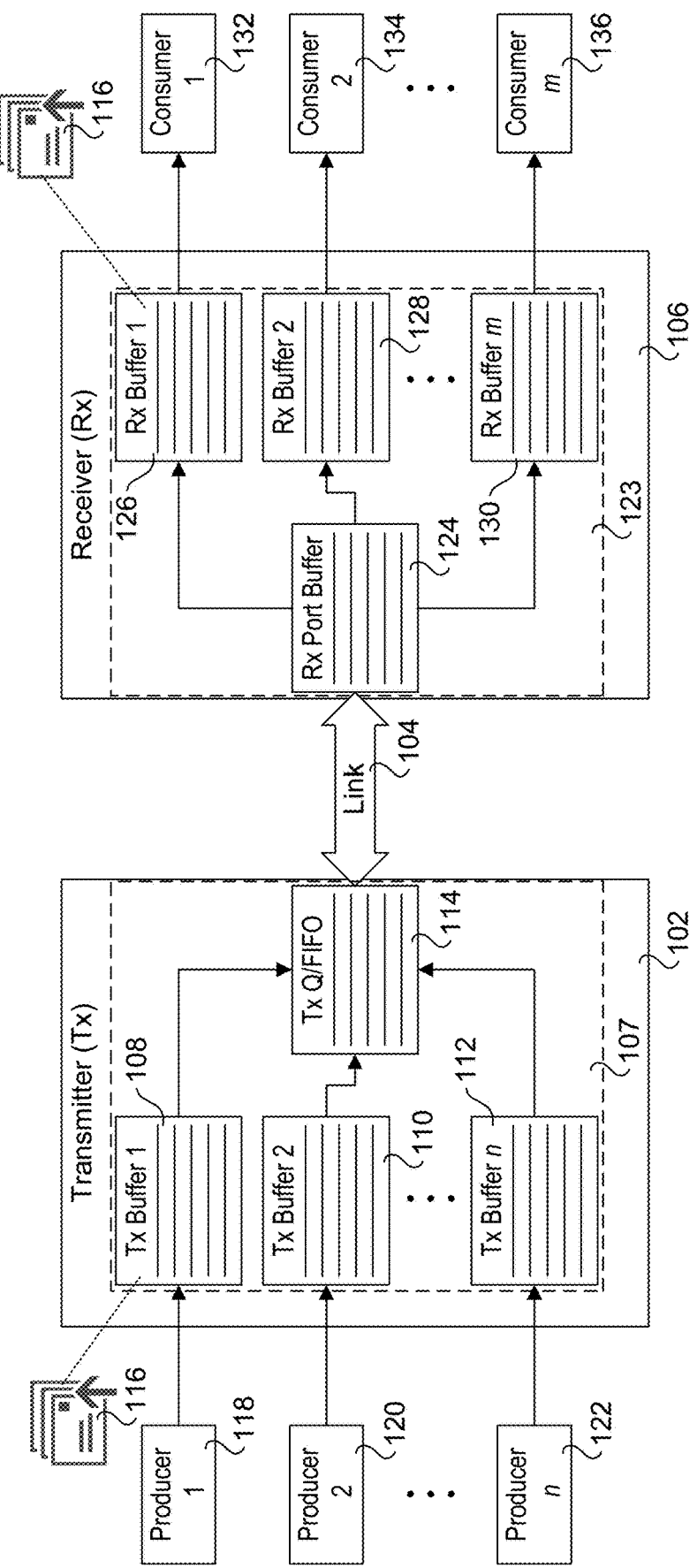
FIG. 1 illustrates a first conventional link architecture under which packets or messages from multiple producers are buffered in respective transmit buffers and selectively enqueued in a transmit queue/FIFO for transmission over a link.

Embodiments of methods and apparatus for dynamic low-latency link compression schemes are described herein. In the following description, numerous specific details are set forth (such as implementation using Universal Path Interconnect) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments now described, low-latency link compression schemes and related techniques are disclosed that facilitate higher throughput than available via the nominal link bandwidth with little to no impact on latency. Additional aspects of exemplary embodiments include very high throughput for compression and decompression, operation on small block sizes, and low added design complexity and power footprint. To better understand operations of the embodiments and to better appreciate the advantages provided by the embodiments, the following description of conventional link architectures and operations is provided.

Figure 1A:
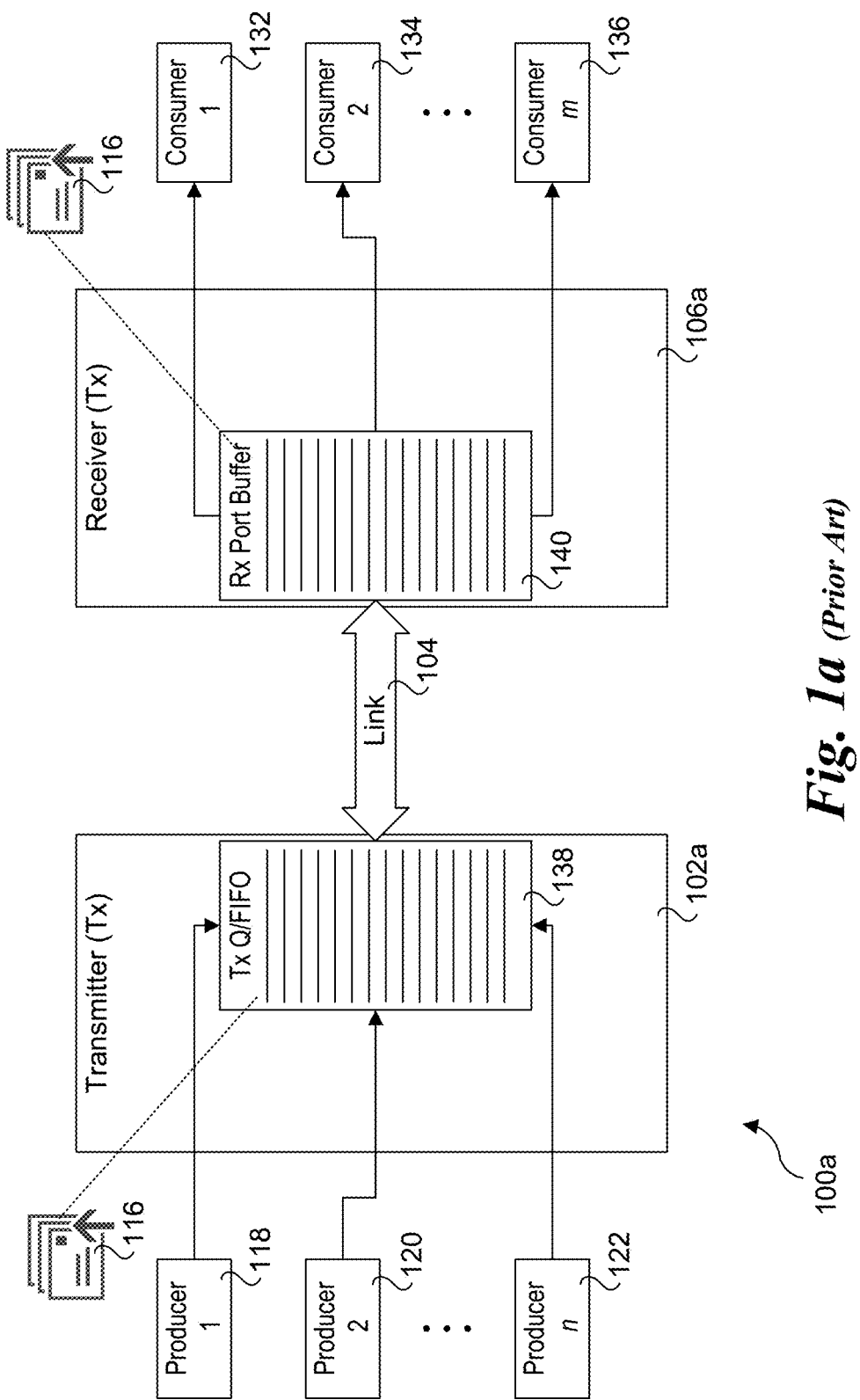
FIG. 1a illustrates a second conventional link architecture under which packets or messages from multiple producers are directly enqueued in a transmit queue/FIFO for transmission over a link.

FIGS. 1 and 1a illustrate examples of buffer/queue and link contention issues with data transmission using conventional link interfaces. As shown in link architecture 100 of FIG. 1, a transmitter (Tx) 102 transmits data over a link 104 to a receiver (Rx) 106. Transmitter 102 is depicted as implementing a transmit buffer/queue hierarchy 107, which includes n Tx buffers (depicted as a Tx buffers 108, 110, and 112) and a Tx queue/FIFO (First-in, First-out) 114. In the illustrated embodiment, each Tx buffer is used to buffer packets and/or messages 116 from a respective producer 1 . . . n, depicted as producers 118, 120, and 122.

Transmit buffer/queue hierarchy 107 is illustrative of various transmit buffer/queue configurations. For example, under one approach, packets or messages 116 are stored in each of Tx buffers 108, 110, and 112, while pointers to the packets or messages are stored in Tx queue/FIFO 114. The pointers are processed in FIFO order. For a given pointer, the corresponding packet/message is retrieved (i.e., read) from the applicable Tx buffer, and buffered in a transmit output buffer (not shown) prior to being transmitted over link 104. Under one approach, the packet or message data is pulled from the applicable Tx buffer and added to an output bitstream that is transmitted over link 104.

Under another approach, the packets in Tx buffers 108, 110, and 112 are pulled into Tx queue/FIFO 114 or otherwise copied into FIFO slots in Tx queue/FIFO 114 using a Tx scheduler or the like (not shown). In some implementations, the Tx buffers are implemented as FIFO queues, while in other implementations the packets/messages are stored in Tx buffers in a manner that is not ordered.

Receiver 106 includes a receive buffer hierarchy 123, including an Rx port buffer 124 at a first level of the hierarchy and m Rx buffers, depicted as Rx buffers 126, 128 . . . 130, at a second level of the receive buffer hierarchy. Each of them Rx buffers is associated with a respective consumer, as depicted by consumers 132, 134 . . . 136 (also labeled and referred to herein as consumer 1, 2 . . . m). Generally, the number of consumers m may be less than, equal to, or greater than the number of producers n. Depending on the implementation, an agent or other logic associated with receiver 106 (not shown) may push packets/messages into the second level Rx buffers, or distributed logic may pull packets messages from Rx port buffer 124 into Rx buffers 126, 128 . . . 130. For example, logic associated with Rx port buffer 124 (not shown) may inspect packet headers and either cause packets to be forwarded to the appropriate second level buffers or coordinate with an agent or the like associated with one or more second level buffers to pull packets from Rx port buffer 124 based on the packet header information. As another option, consumers 132, 134 . . . 136 may not be associated with a respective second level Rx buffer, and packets in the second level Rx buffers are forwarded to consumers via a virtual switch (not shown) or other routing mechanism.

Under link architecture 100a of FIG. 1a, then producers 118, 120 . . . 122 forward (or otherwise place) packets or messages in a Tx queue/FIFO 138 in a transmitter 102a. Meanwhile, receiver 106a includes an Rx port buffer 140 from which packets or messages are forwarded to the m consumers 132, 134 . . . 136 or otherwise the m consumers pull the packets from Rx port buffer 140. As before, the Tx queue/FIFO may either store packets and/or messages, or store pointers to the packets/messages.

Returning to link architecture 100 of FIG. 1, there are various scenarios where link contention issues may arise. First, if the n producers collectively produce data (i.e., packets/messages) to be sent at a rate that is greater than the bandwidth of link 104, one or more of the Tx buffers will get filled, which will generally be handled by throttling the amount of data being inserted into the Tx buffer(s) by the producers. Some link embodiments may employ a reliable transport mechanism that guarantees delivery of packets/messages over the link. This will result in a portion of the link bandwidth being used for resending messages and/or ACKnowledgements (ACKs). Under some implementations, the reliable transport mechanism is implemented at the Link layer, as described below.

Similarly, under the link architecture 100a of FIG. 1a, if the n producers produce data at a rate that is greater than the link bandwidth for link 104, the Tx queue/FIFO will eventually become overfilled (e.g., filled beyond a predetermined threshold), and an appropriate action will be applied to the producers to prevent the Tx queue/FIFO from becoming completely full.

Link buffer contention issues may also occur downstream—that is at the receiver. In this case, either the Rx port buffer reaches an overfill level or one of the Rx buffers reaches an overfill level. To prevent additional data from being received (or otherwise to effectively throttle the rate at which data is being received), various mechanisms may be implemented using well-known techniques. In some implementations, a link credit mechanism is used under which a sender (e.g., transmitter 102 or 102a) has to have enough credit to send additional data. For example, credit-based flow control may use this approach, wherein the flow may be managed at one or more of a physical link level or a virtual channel level.

In accordance with aspects of the embodiments now disclosed, techniques and associated mechanisms are disclosed that dynamically compress packets and/or messages on a selective basis to prevent buffer overflow and reduce or eliminate link contention issues. The scheme is flexible and scalable, enabling the use of compression to be adapted based on current parameters and link conditions, such as buffer and queue fill levels.

In implementing a transmission scheme with dynamic compression, the biggest challenge is the impact to latency. Under the embodiments described herein, the main idea is that the compression is not added to the data-path, but sits on the side of the transmit queue. The system monitors the queue depth and, accordingly, initiates compression jobs based on the depth. In some embodiments, different compression levels are supported dynamically depending on queue depth. In addition, packets can be marked as part of critical or non-critical flows, which affects whether they are target for compression.

Figure 2:
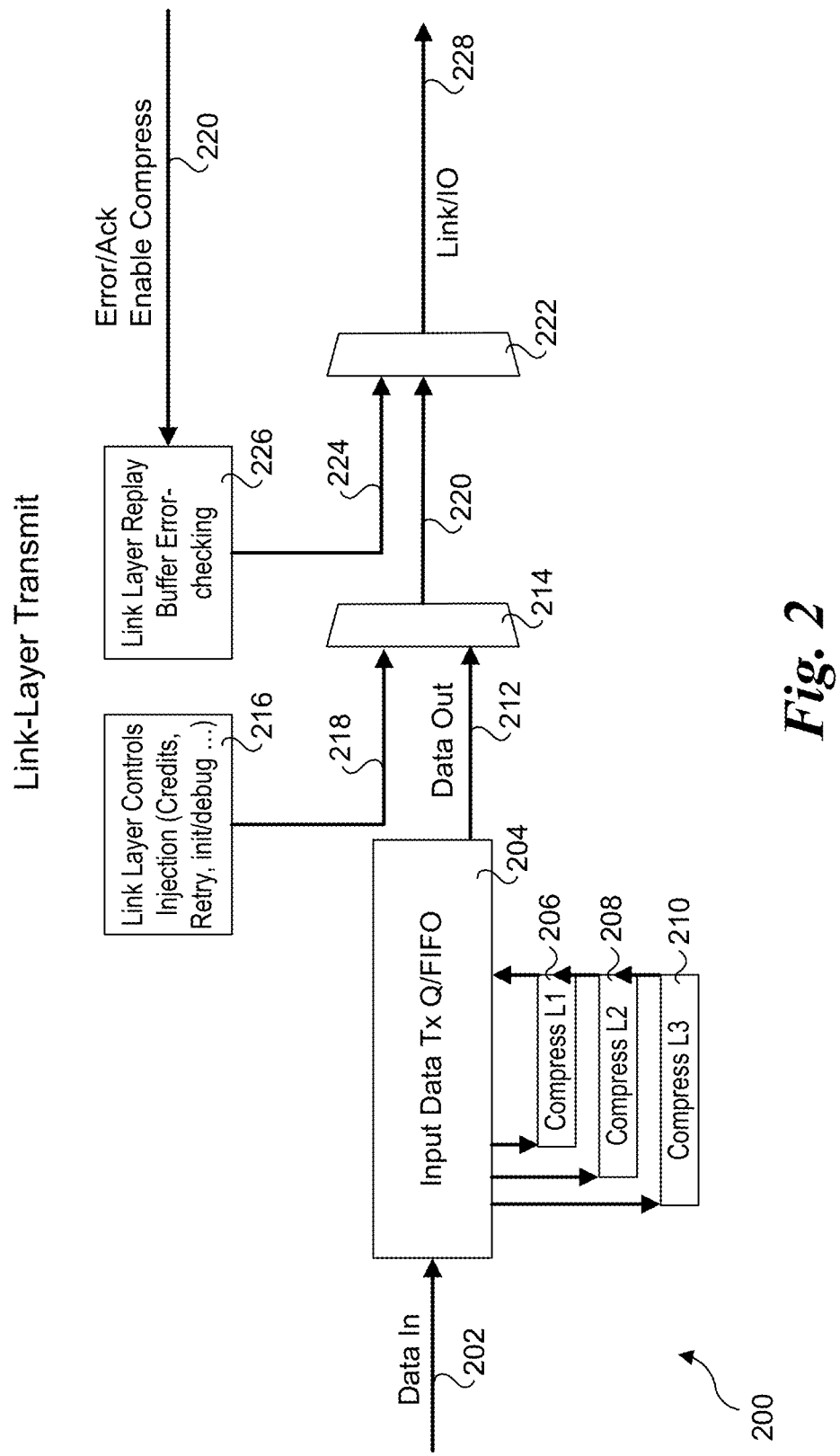
FIG. 2 is a schematic diagram illustrating aspects of a low-latency link compression scheme, according to one embodiment.

FIG. 2 shows a Link-layer transmit architecture 200 configured to implement aspects of the dynamic low-latency link compression scheme, according to one embodiment. Data 202, such as packets and/or messages, is input to an input data Tx queue/FIFO 204. Compressors 206, 208 and 210 are configured to selectively access data stored in Tx queue/FIFO 204 and perform compression operations on the data. Under one approach, the compressors are stacked similar to what is illustrated in FIG. 2, where each level in the stack (e.g., L1, L2, L3), performs a different compression operation. Under another approach, separate compressors or compression engines are used that support different levels of compression. As will be described in further detail below, input data Tx queue/FIFO may be implemented as multi-port memory, supporting multiple concurrent read and write accesses.

Output data 212 is read out of input data Tx queue/FIFO 204 (or otherwise forwarded by Tx queue/FIFO 204) and provided as an input to a multiplexer 214. A link layer control block 216 injects Link layer control information 218 into multiplexer 214. For example, the Link layer control information might include credits, retry requests, information relating to initiating a link or debugging a link, etc.

The output 220 of multiplexer 214 is fed into one of the inputs of second multiplexer 222. The second input 224 of multiplexer 222 is provided by a Link layer replay buffer error checking block 226. As will be described below, some embodiments may employ a replay buffer at the Link layer under which reliable packets or messages or buffered in the replay buffer until some indicia is received or determined that the reliable packet or message has been successfully transferred over the link without error.

The output of multiplexer 222 is a bitstream including data corresponding to either an original transmission of a packet/message (if input 220 is selected) or retransmission of a packet/message from the replay buffer (if input 224 is selected), under which the selected packet or message is transmitted as a bitstream over a link or IO interconnect 228. For simplicity, link/IO 228 is shown as a single arrow that is representative of both single- and multi-lane links/interconnects, as well as bus-type interconnects. As further shown in FIG. 2, Link layer replay buffer and error checking block may receive inputs 230 from a link peer interface (not shown) comprising one or more of error indicia, ACKnowledgements, and enable compression indicia.

Aspects of the flow in FIG. 2 are implemented in the Tx queue/FIFO that receives the data packets to be transmitted. In one embodiment, the three compress engines shown have an extra cycle latency with respect to the previous level compressor, but write back at the same time.

Figure 3A:
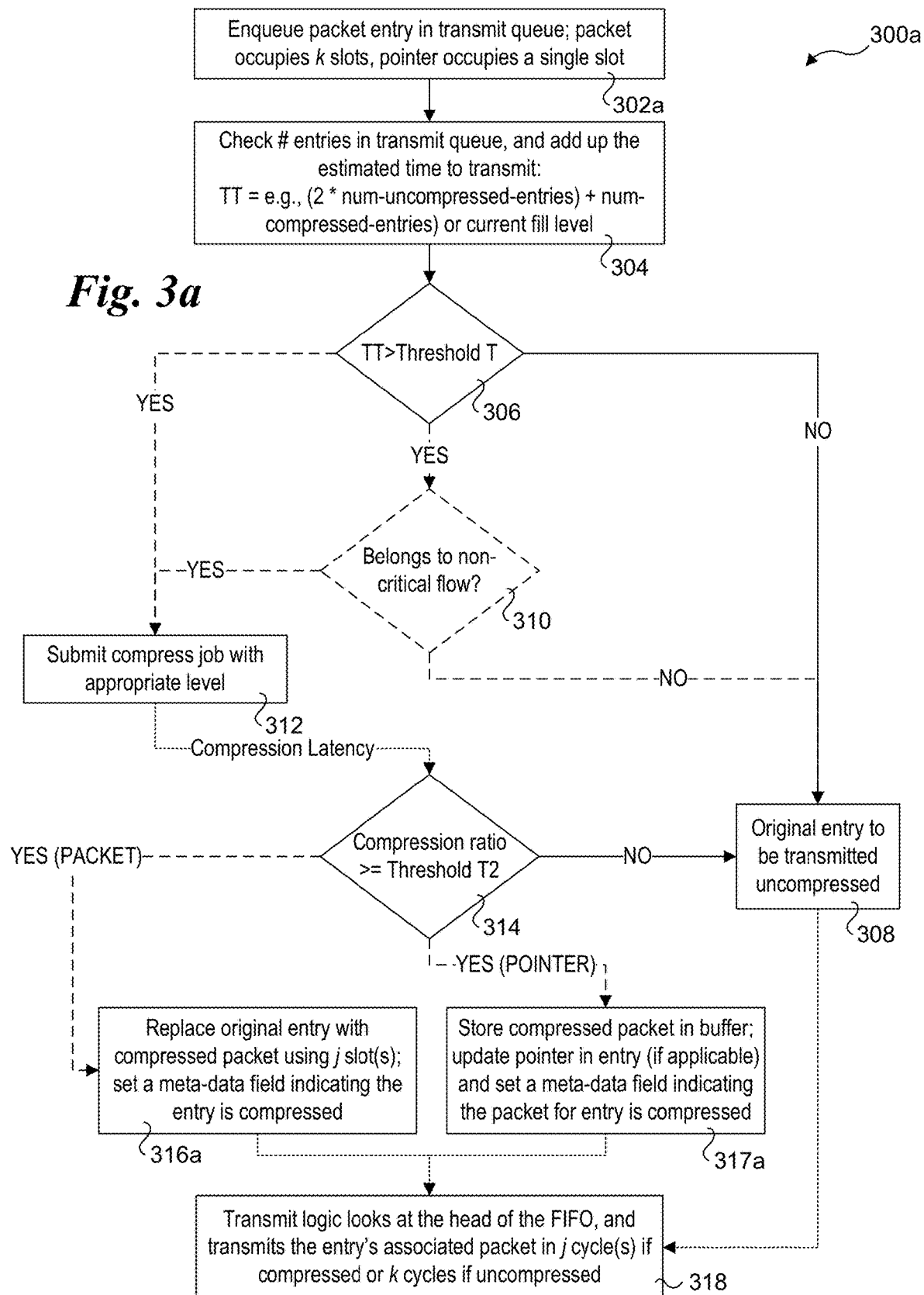
FIG. 3a is a flowchart illustrating operations and logic for implementing low-latency link compression schemes under which packets or messages are enqueued in a transmit queue prior to being dynamically selected for compression, according to one embodiment.

FIG. 3a shows a flowchart 300a illustrating operations and logic for implementing low-latency dynamic compression, according to a first embodiment under which packets or messages are enqueued in a transmit queue prior to selective compression of the packets. For simplicity, the operations of flowchart 300a in FIG. 3a and flowchart 300b in FIG. 3b are described in terms of processing packets. Some link technologies use the term "messages" rather than packets. Accordingly, similar operations illustrated in flowcharts 300a and 300b may be performed using messages rather than packets. In addition, some of the operations depicted in flowcharts 300a and 300b are implementing under a transmit queue that stores packets or messages in either compressed or uncompressed forms. It will be understood by those having skill in the art that similar operations may be performed under which pointers to the packets or messages are enqueued as entries in the transmit queue rather than the packets or messages themselves.

The processing of flowchart 300a begins in a block 302a, where a new packet entry is enqueued in the transmit queue. If the packet itself is enqueued, then that packet will take up k slots in the transmit queue, where k is an integer. For example, non-limiting examples of k include 2 and 3, meaning the (original) packet will occupy 2 or 3 slots in the Tx queue. If a pointer scheme is used under which the Tx queue stores pointers to packets or messages rather than the packets or messages themselves, then the new packet entry will occupy a single slot in the Tx queue. Along with the pointer, the new packet entry may include indicia (e.g., meta-data) indicating the packet is (currently) uncompressed.

In a block 304a, the number of entries in a transmit queue are checked, and an estimated time to transmit TT is determined. For example, the estimated time to transmit might be calculated based on the number of uncompressed entries and the number of compressed entries, such as, $$TT = (2 * \text{number-uncompressed-entries}) + \text{number-compressed-entries} \qquad (1)$$

If packets themselves are stored in the transmit queue, the TT value may equate to a fill level of the transmit queue (e.g., the total number of Transmit queue slots occupied by compressed and uncompressed packet data). For a circular FIFO, the current fill level of the FIFO can be determined by counting the number of FIFO slots that currently have valid entries.

In a decision block 306, a determination is made to whether the TT value calculated in block 304 is greater than a first threshold T. In one embodiment, the threshold T is determined as a function of the latency added to compress the packet on the transmit side and decompress the packet on the receive side. For example, if the minimum latency of compressor is C cycles, and latency of decompressor on receive side is D cycles, a threshold T (in cycles) can be chosen as (C+D). The general concept here is that the compression and decompression operations preferably should not add any latency relative to how much time it would take to transmit the uncompressed packet using the normal transmission data-path. If there is sufficient transmit time, this means the packet can be compressed and decompressed without adding any latency relative to the non-compressed transmission time along the Tx data-path.

If TT<=T, the answer to decision block 396 is NO, and the logic proceeds to a block 308 indicating the original entry (e.g., packet or message) is to be transmitted uncompressed (in accordance with transmit operations performed in a block 314 described below). If the TT value is greater than the threshold T, the answer to decision block 306 is YES, and the logic proceeds to an optional decision block 310 in which a determination is made to whether the packet/ message is marked as belonging to a non-critical flow. If the answer is NO, the packet/message belongs to a critical flow and the original entry is left uncompressed, as depicted in block 308.

If the answer to decision block 310 is YES, or if optional decision block 310 is not used and the answer to decision block 306 is YES, then a compression job for the packet/message is submitted at an appropriate compression level in a block 308. For an original packet that is stored in the transmit queue, the packet data will be read from the transmit queue and compressed by a compressor using the appropriate compression level. If a pointer to the packet is stored in the transmit queue, then the packet data will be read from a buffer pointed to by the pointer and compressed by the compressor.

Following compression of the packet, the logic proceeds to a decision block 314 in which a determination is made to whether the compression ratio of the compressed packet is equal or greater than a second threshold T2. For example, T2 may be some predetermined compression ratio, such as 2:1. If the answer to decision block 314 is NO, the original uncompressed transmit will be transmitted, as depicted by block 308, and the compressed packet is discarded. If the answer to decision block 314 is YES and packets are being stored in the transmit queue, the logic proceeds to a block 316a in which the original uncompressed entry is replaced with the compressed packet using j slots. In addition, in one embodiment indicia in a meta-data field is also set indicating the entry is compressed. For example, in one non-limiting example, an original uncompressed packet is stored in the TX queue using two slots (k=2); when the original uncompressed packet is replaced with the compressed packet, it only occupies a single slot (j=1).

If the answer to decision block 314 is YES and pointers to packets are being stored in the transmit queue, the logic proceeds to a block 317a in which the compressed packet is stored in a buffer and the pointer for the entry associated with the (now) compressed packet is updated, as applicable and the meta-data field is set indicating the entry corresponds to a compressed packet. In some embodiments, the original packet will be buffered in a first buffer, and the compressed packet will either be buffered in a different buffer or at a different location in the first buffer, necessitating an update to the pointer. In other embodiments, the original uncompressed packet data is overwritten with the compressed packet data using the same address for the start of the packet, and thus the pointer would not be updated. In one embodiment where a single compression ratio threshold is used, the meta-data field may be composed of a single bit used to whether the packet is compressed or not.

In block 318, the transmit logic looks at the head of the FIFO, selects the entry and transmits the entry's associated packet using j transmission cycles if the packet is compressed, otherwise the original uncompressed packet is transmitted over k cycles. For example, in one embodiment that uses a nominal 2:1 compression scheme, threshold T2 is 2:1, j=1, and k=2. For a nominal 3:1 compression scheme, T2=3:1, j=1, and k=3. For a nominal 3:2 compression scheme, T2=3:2, j=2, and k=3.

Under a second approach, selective dynamic compression of packets is performed prior to enqueuing packets in the transmit queue, as depicted in flowchart 300b in FIG. 3b. The process begins in a block 302b in which a next packet to be processed is retrieved from a transmit buffer or otherwise received for processing (e.g., from a producer or from an agent associated with a link interface). The operation of block 304b is the same as before, except the TT may further include the additional time to transmit the packet.

In response to a NO answer for decision block 306, the logic proceeds to a block 309 in which an entry associated with the uncompressed packet is enqueued in the transmit queue. For example, if the transmit queues is used to store the packets themselves, then the entry that is enqueued includes the packet (which will occupy k slots) along with meta-data indicating the packet is uncompressed. If a pointer scheme is used, the entry includes a pointer to the uncompressed packet occupying a single slot along with meta-date indicating the packet is uncompressed.

Generally, the operations and associated logic for optional decision block 310, block 312, and decision block 314 are the same as in FIG. 3a, except the NO branches flow to block 309 rather than 308. If the answer to decision block 314 is YES, the logic proceeds to a block 312 wherein an entry associated with the compressed packet is enqueued either comprising the compressed packet and occupying j slots or comprising a pointer to the compressed packet occupying a single slot. In addition, a meta-data field is set to indicate the entry corresponds to a compressed packet. For packets that are compressed but are not stored in the queue, the packet data is stored in a buffer pointed to by the pointer.

As before, in block 318, the transmit logic looks at the head of the FIFO and selects a compressed entry if it exists for transmission using j cycles, otherwise the original entry is selected to be transmitted over k cycles. For entries having the associated packet stored in the transmit queue, the entry is copied to the output transit port buffer and subsequently transmitted using a serial or bus-type transmission scheme, depending on the type of link being used. For entries that are pointers, the compressed or uncompressed packet is retrieved (e.g., read) from the buffer location the pointer points to and copied to the output transit port buffer and subsequently transmitted.

As illustrated in FIG. 2 and described above, different levels of compression may be used within the same implementation, such as but not limited to 2:1, 3:1, and 3:2; as such, the indicia in the meta-data field may also indicate one or more of a compression level and type of compression used so the decompressor on the receive side will know what decompression process to use. In one embodiment, for a 3:1 threshold, the uncompressed packet will occupy three FIFO slots (k=3), while the compressed packet will occupy a single slot. For 3:2 compression threshold, the uncompressed packet will occupy three FIFO slots (k=3), while the compressed packet will occupy two slots (j=2). Other compression ratios may also be implemented in a similar manner.

It will further be recognized that when an uncompressed packet that is stored using k slots when it is originally enqueued in the transmit queue is replaced by a compressed packet occupying j slots, the remaining k-j entries will contain invalid data. Accordingly, in one embodiment these entries/slots are marked invalid such that they are not counted when determining the TT level and are skipped by the transmit queue Head pointer.

Figure 3C:
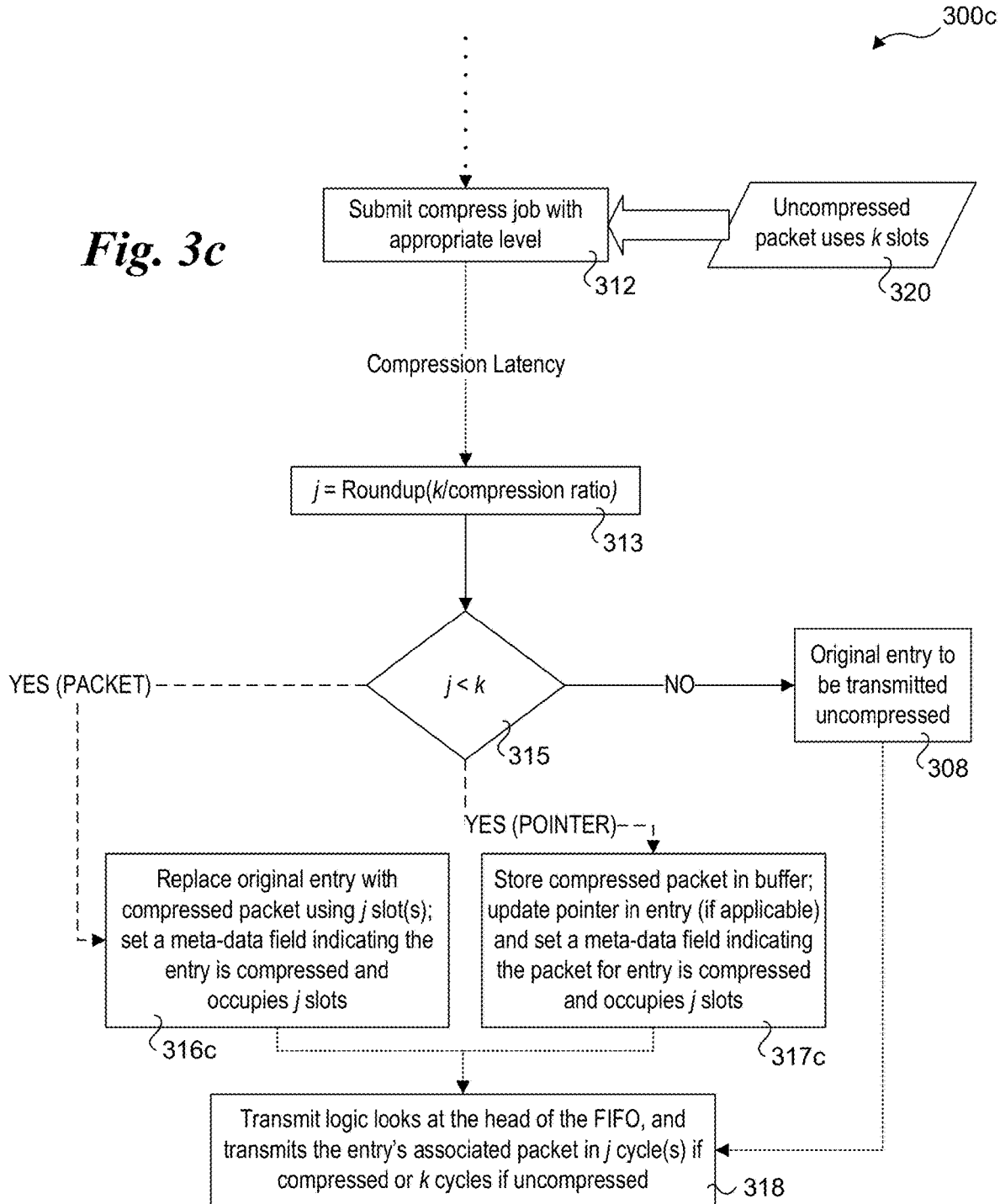
FIG. 3c is a flowchart illustrating an augmentation to the flowchart of FIG. 3a using an alternative scheme under which multiple levels of compression are supported and packets and queued and transmitted using a number of transmit cycles that are a function of the compression ratios of the packets.
Figure 3D:
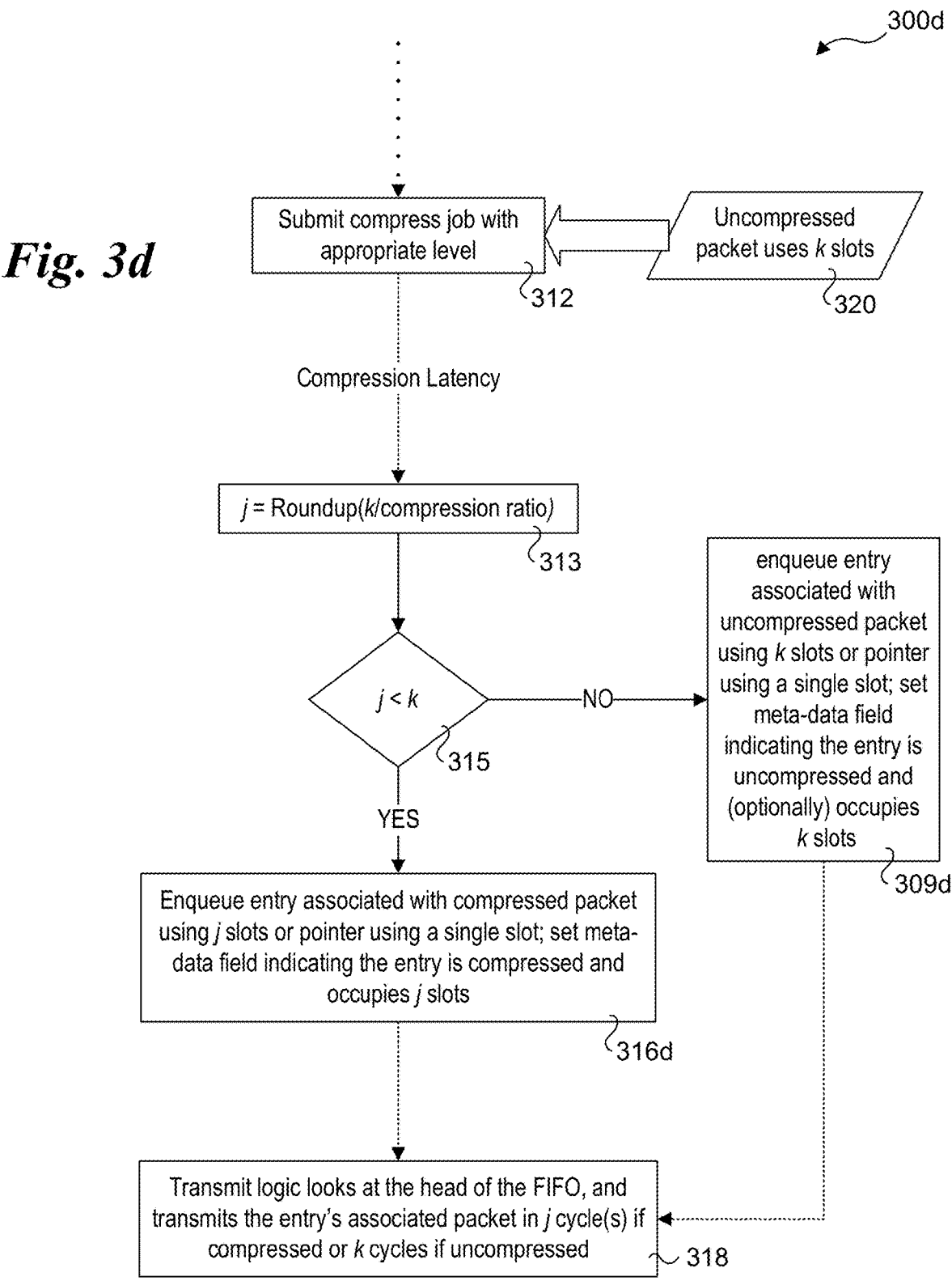
FIG. 3d is a flowchart illustrating an augmentation to the flowchart of FIG. 3b using an alternative scheme under which multiple levels of compression are supported and packets and queued and transmitted using a number of transmit cycles that are a function of the compression ratios of the packets.

Examples of multiple level compression schemes are shown in flowchart 300c and 300d of FIGS. 3c and 3d, which show alternative implementations of the operations and logic used by flowcharts 300a and 300b of FIGS. 3a and 3b, respectively. For simplicity, flowcharts 300c and 300d show the operations beginning in block 312; it will be understood that the other operations would be similar to those shown in flowcharts 300a and 300b, as discussed above.

As illustrated in each of flowcharts 300c and 300d, a data input 320 identifying the number of slots k used to store compressed packets is provided to block 312 (or alternatively could be provided to block 313). In block 313 a calculation of j is made based on the actual compression ratio obtained by compressing the packet. The equation is, $$j = \text{Roundup}(k/\text{compression ratio}) \quad (1)$$

wherein Roundup is used to round up the result of k divided by the actual compression ratio to the next integer (if k/compression ratio is not an integer). For example, suppose that k=3, and a variable compression scheme supporting 3:2 and 3:1 compression ratio thresholds are to be supported. Under this scheme, if the actual compression ratio is greater than 3:1, k/compression ratio will be less than 1, and equation (1) will return j=1. If the compression ratio is between 3:2 and 3:1, j=2. For an actual compression less than 3:2, j=3. The scheme can be extended in a similar manner as a function of k. For example, the applicable compression ration thresholds for k=4 would be 4:3, 2:1, and 4:1. Returning to flowchart 300c, in a decision block 315 a determination is made to whether j less than k. If it is, and packets are stored in the entries, the logic proceeds to a block 316c in which the original entry is replaced with the compressed entry using j slots, and the meta-data field is set to indicate the entry is compressed and occupies j slots. Generally, the number of slots j may be coded using an augmented binary scheme (for efficiency) to from which both the number of slots used and whether the entry is compressed or not can be determined. In one embodiment, the number of slots is simply encoded as a binary value using two or more bits (as needed). In one embodiment, the meta-data can be coded such that the actual number of slots j is offset from or a corresponding function of a corresponding binary value, since the value '00' in binary would have no corresponding number of slots (i.e., you can't have zero slots). Thus, a variable compression scheme that could use 1, 2, 3 or 4 transmission cycles to send a packet could be encoded using 2 bits rather than 3.

Figure 4:
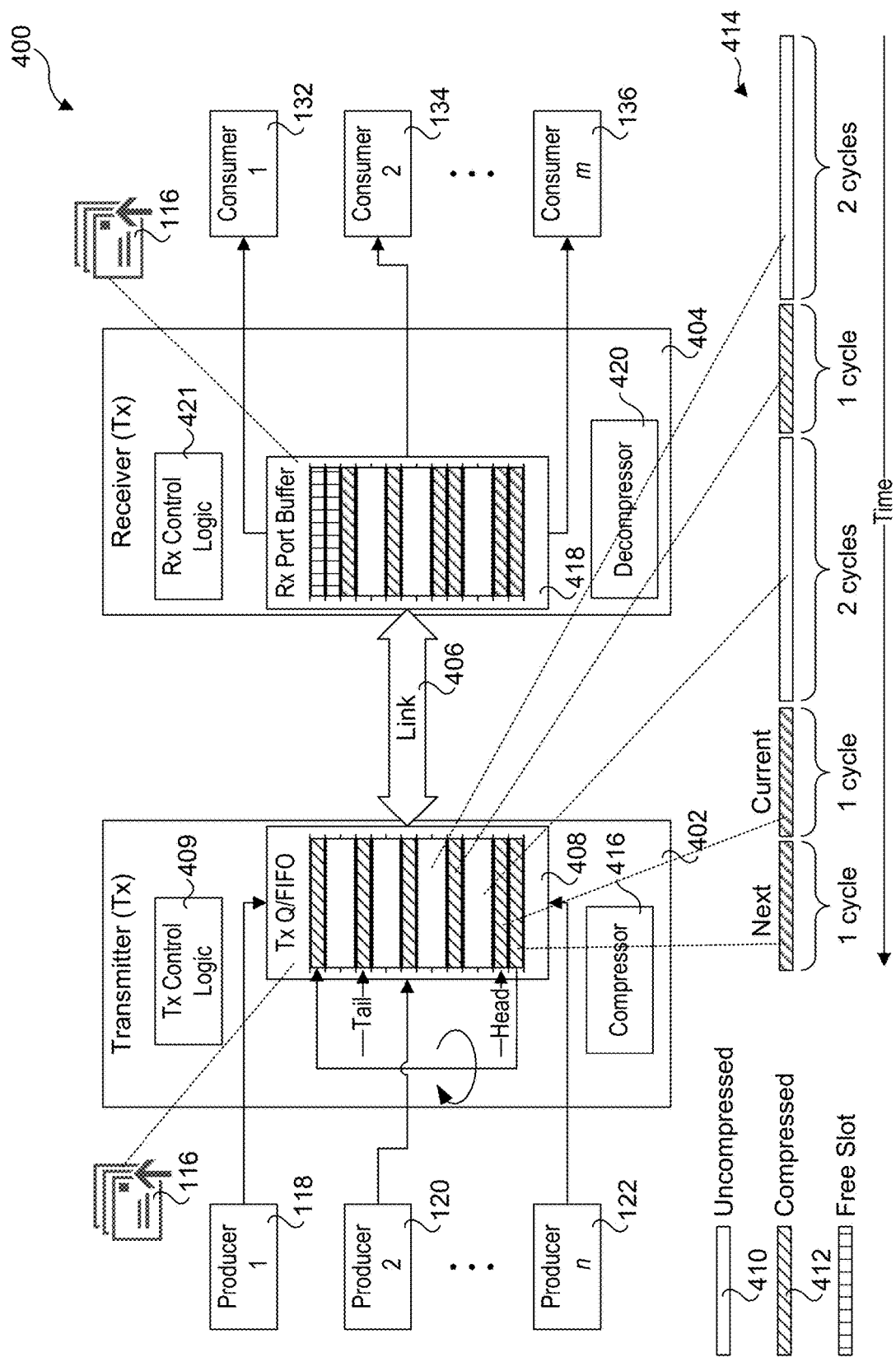
FIG. 4 illustrates a first link architecture supporting low-latency link compression under which packets or messages are enqueued in a transmit queue and the link is a serial link, accordingly to one embodiment.

If the answer to decision block 315 is YES and a pointer scheme is being used, the logic proceeds to a block 317c and the compressed packet is stored in a buffer, the pointer is updated (if applicable), and the meta-data field is set to with indicia that identifies the packet is compressed and the number of slot j used to store the packet. If the answer to decision block 315 is NO, the original entry will be transmitted uncompressed, as depicted by block 308. The logic from each of blocks 316c, 317c, and 308 proceeds to block 318, which operates in the similar manner to that described above for flowcharts 300a and 300b. Flowchart 300d of FIG. 4 shows similar operations for an embodiment under which compression is performed prior to enqueuing the associated entries in the transmit queue. In this case, if the answer to decision block 315 is YES, the entry associated with the compressed packet is enqueued using either j slots or a single slot for a pointer, and the meta-data field is set to identify the packet is compressed and the number of slots used to store the packet. If the answer to decision block 315 is YES, the logic proceeds to a block 316d in which an entry associated with uncompressed packet is enqueued using j slots or pointer using a single slot, and the meta-data field is set indicating the entry is compressed and the number of slots j used to store the packet. If the answer to decision block 315 is NO, the logic proceeds to block 309d in which an entry associated with uncompressed packet is enqueued using k slots or pointer using a single slot, and the meta-data field is set indicating the entry is uncompressed. Optionally, the meta-data field may be set to identify the number of slots used to store the uncompressed packet. For example, if the number of slots used to store the packet is 3, under a two-bit meta-data field the value could be set to either '00' or '11', wherein the former indicates the packet is uncompressed and since the number of slots use to store uncompressed packets is already known, there is no need to encode it separately. As before, the logic proceeds from each of block 316d and 309d to block 318 in which the entries associated packet is transmitted using j transmit cycles of compressed or k transmit cycles of uncompressed.

FIG. 4 shows a link architecture 400 illustrated one embodiment of a dynamic 2:1 link compression scheme. Link architecture 400 includes a transmitter 402 coupled to a receiver 404 via a link 406. Transmitter 402 includes a Tx queue/FIFO 408, Tx control logic 409, and a compressor 416. Tx queue/FIFO 408 is used to temporarily store packets 116, wherein the packets are stored in an original uncompressed format 410 or a compressed format 412 and each packet is associated with a respective entry in the queue. In one non-limiting embodiment, each of packets 116 has an original size of 64 Bytes, and a size of 32 Bytes when compressed. In the illustrated embodiment, each FIFO slot includes 32 Bytes for storing packet data such that a compressed packet occupies a single FIFO slot, while an uncompressed packet (64 Bytes) occupies two sequential FIFO slots. Under link architecture 400, each packet has an original fixed size of 64 Bytes. Each slot may also include additional storage for meta-data or the like.

In the embodiments illustrated herein, Tx queue/FIFO 408 is a circular FIFO that includes a Head pointer and a Tail pointer. Entries are added to the FIFO at the FIFO slot pointed to be the Tail pointer, while entries at the FIFO slot pointed to by the Head pointer are read out to be added to a transmit bitstream 414. In one embodiment, packets that are to be compressed are compressed using a compressor 416 prior to be inserted into Tx queue/FIFO 408. Under an alternate approach, original packets (to be compressed) are added to a sequential pair of slots in Tx queue/FIFO 408, the packet data is read out by compressor 416 and compressed, and the written back into a single slot in Tx queue/FIFO 408. Under this approach it is optional whether to adjust the FIFO slots to pick up the "slack" that may occur when an original packet occupying two FIFO slots is written back to a single slot, or mark the (now) unused slot as invalid.

As illustrated, the compressed and uncompressed packets are read out of Tx queue/FIFO 408 in FIFO slot order and added to transmit bitstream 414, wherein the data corresponding to an uncompressed packet is transferred over 2 cycles, while compressed packets are transferred over a single cycle.

At receiver 404 the packets are received at a receive port and buffered in an Rx port buffer 418. Compressed packets are then decompressed using a decompressor 420. Generally, the decompressed packets may be decompressed "in place" (i.e., written back to Rx port buffer 418 after decompression), or they may be read out of Rx port buffer 418, decompressed by decompressor 420, and forwarded to an applicable consumer or buffered in a separate buffer. Under various embodiments, receiver 404 may include a packet classifier or other logic (collectively depicted as Rx control logic 421) to determine the intended recipient (e.g., consumer 1, 2, . . . m), for the packets, or the determination of the applicable consumer may be effected by other means. For example, as described below, in some embodiments link 404 is a socket-to-socket link that couples a pair of processors implementing ring interconnect architectures that include a scheme for distributing packets to intended recipients.

Generally, information concerning the compression of packets may or may not be implemented, depending on the compression scheme and the type of data sent over the link. For example, under some embodiments multiple levels of compressors are used on the transmit side, while at the receiver only a single compressor is use since there is adequate information in the compressed packet data that is received at the receiver to decompress the data. In some embodiments information concerning a type and/or level of compression may be included in some of the compressed and uncompressed packet data. For example, in some embodiments meta-data relating to compression information is included in packet or message header information.

Figure 4A:
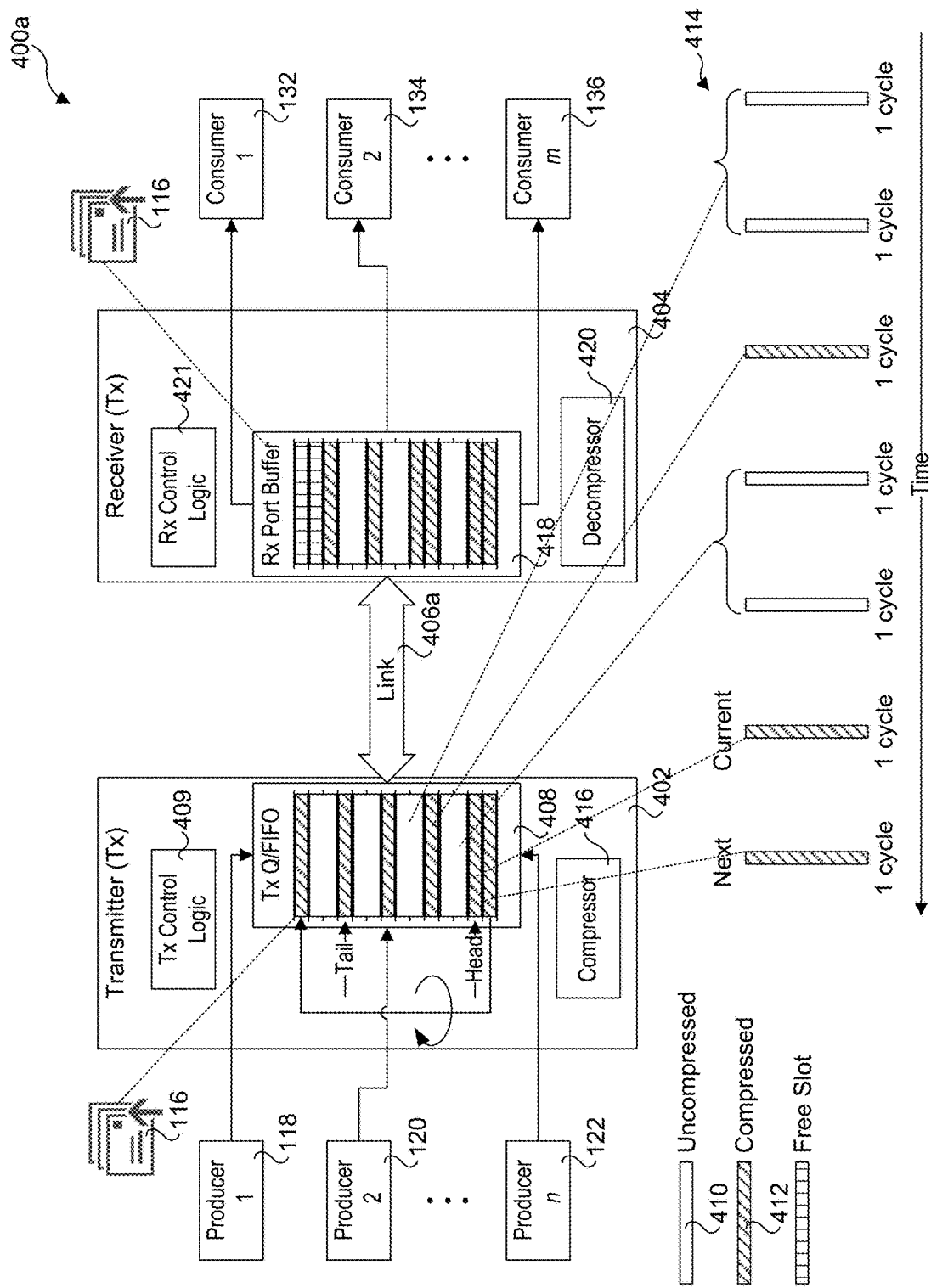
FIG. 4a illustrates an alternative implementation of the link architecture of FIG. 4, wherein the link is a bus-type link, accordingly to one embodiment.

Under link architecture 400, link 406 is a serial link comprising one or more lanes. Optionally, data can be transmitted using a bus-type link, wherein data is transmitted in parallel during the cycle. As example of link architecture 400a employing a bus-type link 406a is shown in FIG. 4a. In this example, both the FIFO slots and the bus are 32 Bytes wide, or otherwise have the same width. Accordingly, uncompressed packets are transmitted over link 406a using two bus cycles, while compressed packets are transmitted over one bus cycle.

Figure 4B:
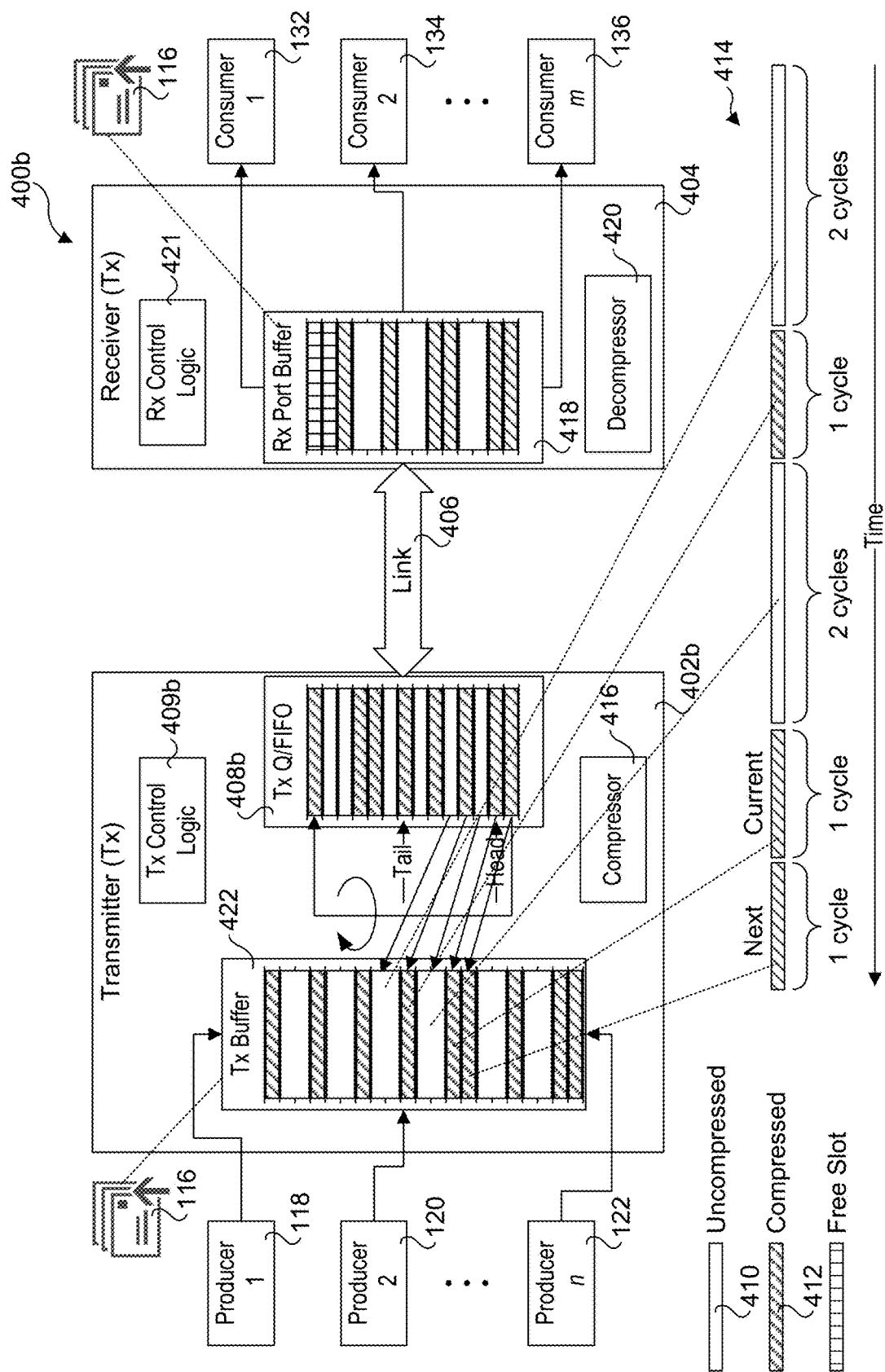
FIG. 4b illustrates a second link architecture supporting low-latency link compression under which pointers to packets or messages are enqueued in a transmit queue rather than the packets or messages themselves, accordingly to one embodiment.

As discussed above, a Tx queue/FIFO can be used to store pointer to packets/messages (and related metadata) rather than store the packets/messages themselves. Link architecture 400b of FIG. 4b illustrates an example of a dynamic compression scheme implementing this approach using a transmitter 402b including Tx control logic 409b. The packets 116 generated by consumers 1, 2, . . . n are written to a Tx buffer 422. For simplicity, Tx buffer 422 is shown as a single buffer; it will be recognized that one or more Tx buffers may be used, such as a respective Tx buffer per producer in a manner similar to that shown in FIG. 1. Tx queue/FIFO stores pointers to the packets in Tx buffer 422, along with meta-data indicating whether the packet associated with the FIFO entry is compressed, optionally identifying a level of compression used if the dynamic compression scheme is to support multiple levels of compression. In connection with processing of a given packet, such as in accordance with aspects of flowcharts 300a and 300b, some packets will be compressed, while others will remain uncompressed. In the example of FIG. 4b, the packet data would be read by compressor 416, compressed, and written to Tx buffer 422. It is noted that another level of Tx buffers that are not shown may be used to buffer packets prior to compression, or the packets may be (effectively) compressed in place (e.g., the compressed packet data is written back to the same location containing the uncompressed packet).

When the FIFO entries of Tx queue/FIFO are processed, the packet data identified by the pointer in the FIFO entry currently pointed to be the Head pointer will be read out to be added to the transmission bitstream 414 when link 406 is a serial link. If link 406 is a bus, the packet data will be transferred in a manner similar to that shown in FIG. 4a.

Note that the 2:1 dynamic compression schemes illustrated in FIGS. 4, 4a, and 4b are merely an example of a particular compression ratio and are not to be limiting. This approach may be extended to other schemes in a natural manner, say for a scenario where the data packet size to bus width or packet size to serial link transfer size (per cycle) is 3:1. Then the compressor will see if it can reduce the data by ⅓rd or ⅔rd. In these cases, it can represent the data as 2 compressed units or 1 compressed unit. The meta-data will store the fact that it's compressed, but also the additional information on how many cycles worth of packet data need to be transmitted (for a given packet). The transmit logic will check if the entry is compressed, and then accordingly send 1 or 2 compressed packets, else 3 packets as with the normal uncompressed data.

Under another approach, compressed packet data is stored in a separate compressed FIFO (cFIFO) (with meta-data indicating which entry in the original FIFO it refers to) that holds compressed data. The transmit logic looks at the head of the original FIFO and the cFIFO and picks the compressed entry where possible.

Figure 4C:
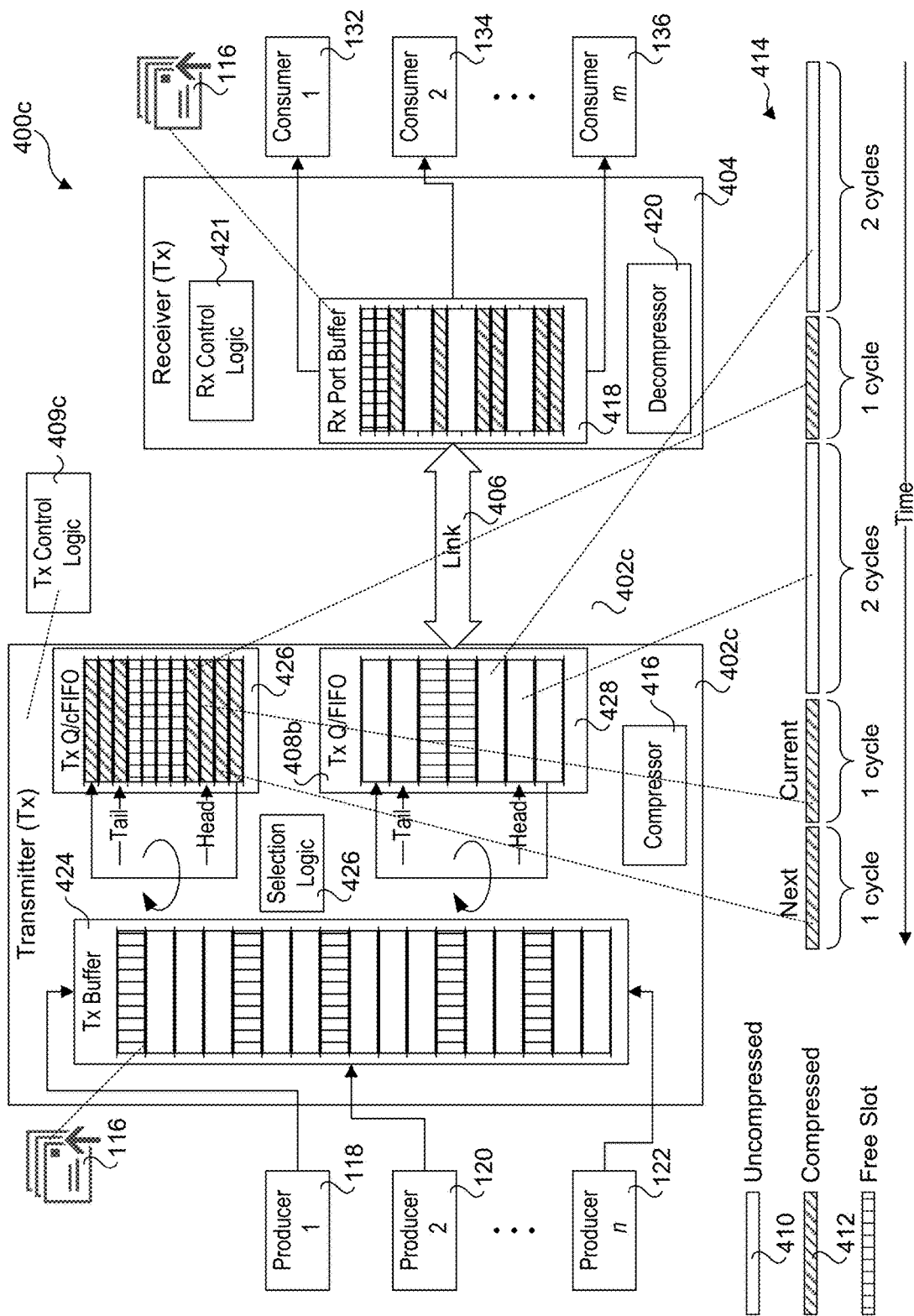
FIG. 4c illustrates a third link architecture supporting low-latency link compression under which separate transmit queues are used to queue compressed packets or messages and uncompressed packets or messages, accordingly to one embodiment.

Link architecture 400c of FIG. 4 illustrates an example of this approach. Transmitter 402c now includes Tx buffer 424, a Tx queue/cFIFO 426, a Tx queue/FIFO 428, Tx control logic 409c and selection logic 426. In a manner similar to that discussed above, producers 1, 2, . . . n generate packets 116 that are buffered in Tx buffer 424. Generally, Tx buffer 424 may be implemented as an unordered buffer or as a FIFO. In the example illustrated in FIG. 4c, Tx buffer has multiple 64 Byte slots, and the size of each (uncompressed) packet is 64 Bytes.

Selection logic 426 includes logic for selecting which packets are to be compressed, and for selecting which of Tx queue/cFIFO 426 and Tx queue/FIFO 428 to read out the next packet data to be added to transmission bitstream 414. When a packet is compressed, the uncompressed packet data is read from Tx buffer 424 by compressor 416, which compresses the packet data and writes the compressed packet data to the FIFO slot currently pointed to by the Tail pointer for Tx queue/cFIFO 426. For packets that are not to be compressed, the packet data is read from Tx buffer 424 and written to the FIFO slot currently pointed to by the Tail pointer for Tx queue/FIFO 428.

In addition to the illustrated embodiments, aspects of the embodiments may be combined to implement other embodiments that are not illustrated herein. For example, rather than copying uncompressed packet data to Tx queue/FIFO 428, this Tx queue/FIFO may store pointers to the packet data in Tx buffer 424, and the packet data is read out from Tx buffer 424 when it is added to transmission bitstream 414.

Figure 5:
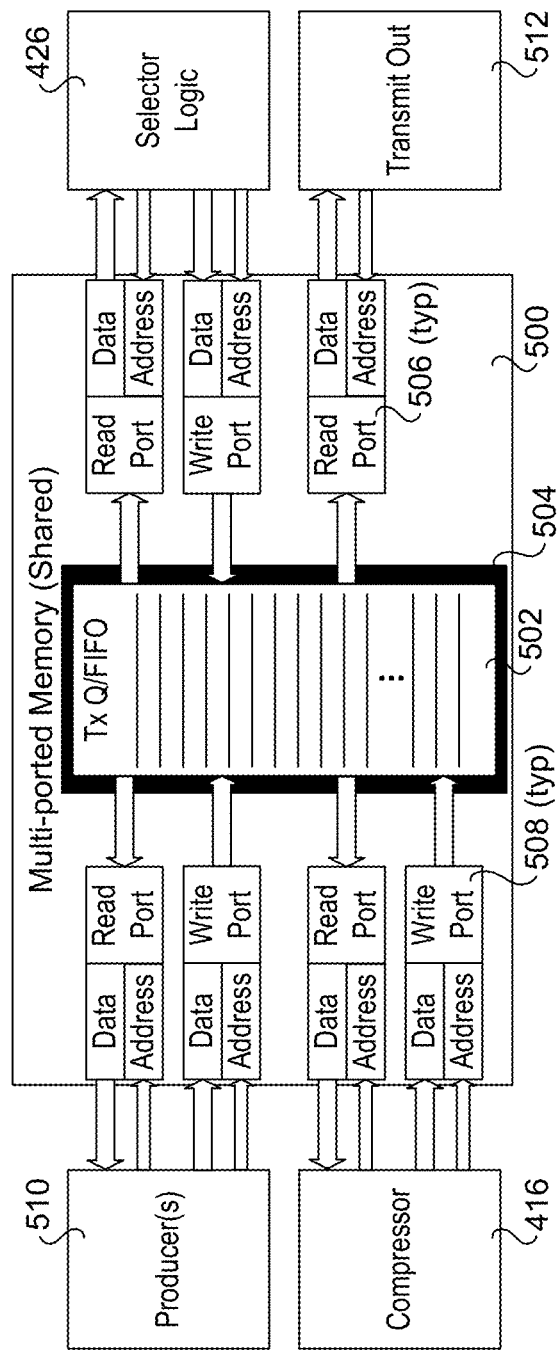
FIG. 5 is a schematic block diagram of an exemplary multi-ported memory suitable for use in the transmit queues disclosed herein.

In some embodiments, it will be advantageous to provided concurrent access to a Tx queue/FIFO. An embodiment of a multi-ported memory 500 configured to support concurrent read and write access to a Tx queue/FIFO 502 is shown in FIG. 5. Multi-ported memory 500 includes a memory region 504 having an address space in which Tx queue/FIFO 502 is implemented. In one embodiment the address space is partitioned in accordance with the transmission scheme, such that each address is associated with a portion of memory region 504 having the same size as the amount of data that is transmitted each cycle. For example, in one embodiment, the address space is partitioned into 32 Byte cachelines (aka memory lines) or the like for a scheme that transmits 32 Bytes per cycle.

As further illustrated, multi-ported memory 500 includes multiple read ports 506 and write ports 508. Various components are provided access to multi-ported memory 500 via the read and write ports; for example, in the illustrated embodiment these include one or more producers 510, a compressor 416, selector logic 426, and a transmit out block 512. These are merely some non-limiting examples of components and/or logic blocks that may access multi-ported memory 500. In some embodiments, each producer may have is own read/write access to a multi-ported memory, or otherwise there may be more than one read/write port to be used by multiple producers. In addition, in some buffer/queue hierarchies, an agent or the like may be used to copy data from a buffer in one level in the hierarchy to a queue in another layer in the hierarchy.

A Tx queue/FIFO may be implemented using conventional techniques for implementing queues and FIFOs that are well-known in the art. For example, embedded logic or the like, may be used to effect enqueue and dequeuer operations, such as managing the head and tail pointers and associated writes (enqueuing) and reads (dequeuing) of the entries in the FIFO Such embedded logic may be in the form of an embedded processor or microcontroller configured to execute instructions, fixed or programmable logic circuitry, such as an FPGA (Field Programmable Gate Array) or ASIC (Application Specific Integrated Circuit), or any combination of hardware and software/firmware used to effect queue and FIFO operations. More generally, embedded logic for controlling the operation of Tx queue/FIFO, as well as other transmitter operations are collectively depicted as Tx control logic 409.

In addition to conventional queue/FIFO operations, more advanced operations may also be implemented, such as skipping multiple entries during a given de-queuing cycle. Also, a scheme may be implemented including separate sets of Head and Tail pointers for compressed and uncompressed packets within a single queue/FIFO. This would be similar to the architecture shown in FIG. 4c, except a single queue/FIFO would be used in which both compressed and original (uncompressed) packets would be enqueued and dequeued, wherein one set of Head and Tail pointers would be used for the compressed packets, while a second set of Head and Tail pointers would be used for the uncompressed packets.

In addition to the logic shown in flowcharts 300a and 300b, another extension of the threshold concept is to have a second larger threshold, and then start to compress an entry beyond the first threshold when entries have queued up beyond a larger second threshold. The concept here is that compressing the current entry is primarily to help later arriving entries.

Receive-Side Compressibility Indication

An additional feature of the system is that the receiver can communicate back to the transmitter an indication of where congestion is occurring. If the congestion is further downstream from where the receiving logic will decompress received packets, then there is no gain from compressing the data and the compressor will be disabled (even though the transmit FIFO has entries greater than the threshold). The exact nature of this communication will depend on the link and protocol, and available bits to convey such information. This may be a simple as sending a single-bit from the receiver saying whether it thinks compressing can be beneficial at that moment, to sending similar indicia using a control packet or message, wherein the control packet or message may be used to convey additional information, such as a number of credits for a given flow.

Choosing the Level of Compression

A compression level indicates how much effort/time is spent trying to compress the data. Often, when we spend more effort, it results in a smaller compressed data size. A simple scheme can just pick a fixed level of compression, and a fixed latency such as 2 cycles. However, we propose an extension where the level is adjusted on a per-entry basis as follows. Say we have three levels of compression which have a latency of {2, 3, 4} cycles. In general, the decompression latency will be fixed for all of these levels. For the entry that's just above the threshold, we can submit a compression job with level-1 (i.e. 2-cycle latency). However, the next entry can be submitted as a level-2 job and the next one as a level-3 job. This will depend on how many parallel compression units there are in the implementation, and the available levels/latencies.

Figure 6:
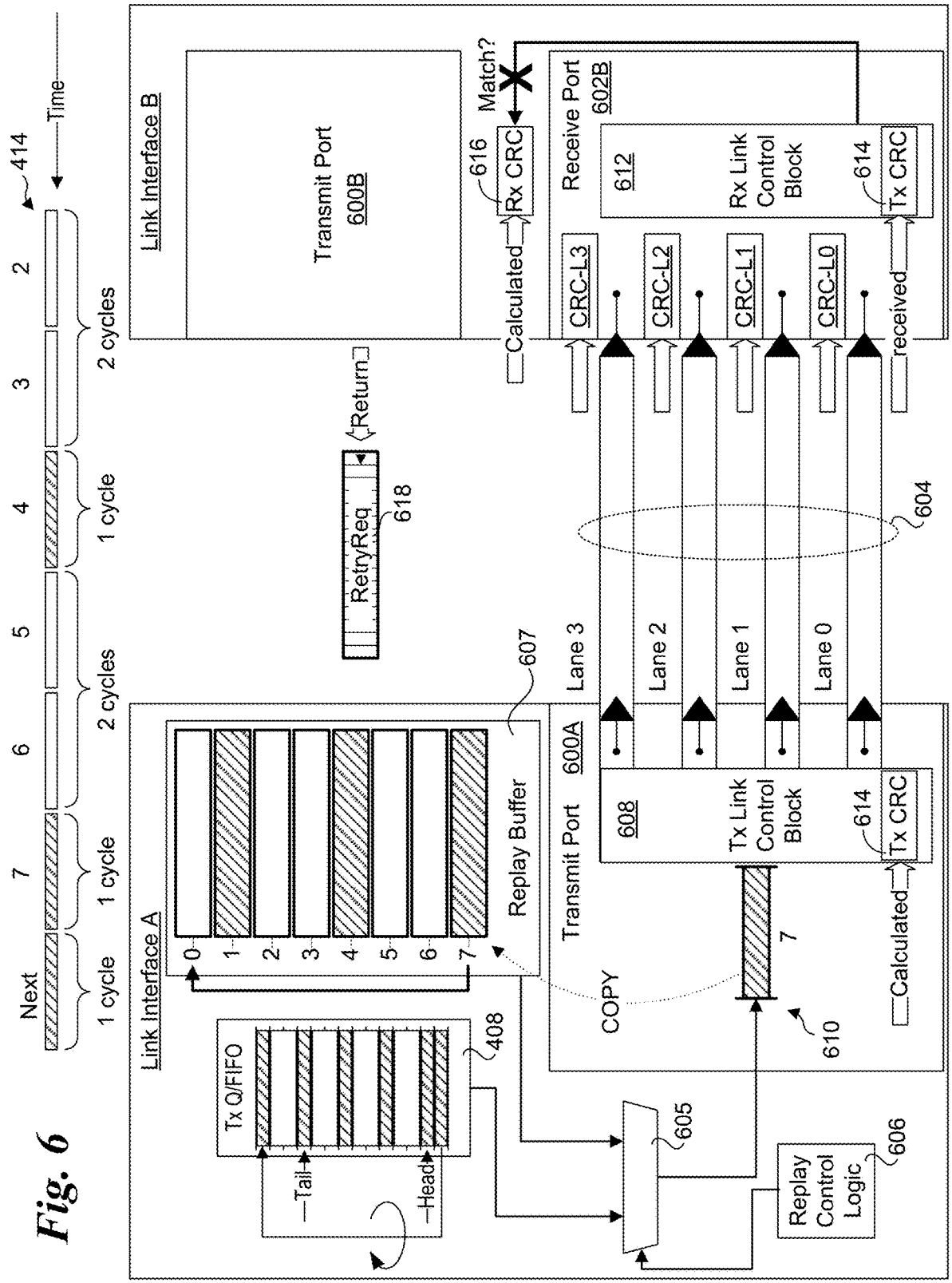
FIG. 6 is a schematic diagram illustrating a link architecture supporting low-latency link compression that further implements a replay buffer and associated retransmission scheme to enhance link reliability, according to one embodiment.

As discussed above with reference to FIG. 2, some embodiments may employ a replay buffer. An exemplary scheme employing such a replay buffer is shown in FIG. 6, which depicts communication between a transmit port 600A of a link interface 'A' and a receive port 602B of a link interface 'B' over a multi-lane link 604. For simplicity, only selected components of link interfaces A and B and transmit port 600A and receive port 602B are shown; it will be understood that an actual implementation will further include component similar to that shown in FIGS. 4, 4a, 4b, and 4c, as applicable, and that each of link interface A and B will include both a transmit port and a receive port having similar configurations, such as illustrated by transmit port 600B for link interface B. Link interface A further includes a Tx queue/FIFO 408, a multiplexer 605, a replay control logic block 606, and a replay buffer 607. In the illustrated embodiment, replay buffer 607 is implemented as a circular FIFO having eight slots for illustrative purposes—the actual number of slots in the replay buffer may vary, depending on various link parameter considerations, including the link bandwidth and the physical length of the link.

Transmit port 600 includes a Tx link control block 608 and in Tx port buffer 610. Receive port 602 include an Rx link control block 612 and in Rx port buffer (not shown). As will be recognized by those skilled in the art, each of transmit port 600 and receive port 602 would further include applicable Physical Layer (PHY) circuitry, which is not shown for clarity.

The replay buffer scheme of FIG. 6 operates in the following manner. When packets are read-out (dequeued) from Tx queue/FIFO 408, they are buffered in Tx port buffer 610. Just prior to being transmitted a first time, a copy of the packet is written to a current slot in replay buffer 606, and the replay buffer pointer is advance by one to point to the next slot. A CRC (cyclic redundancy check) is calculated for the packet, as depicted by calculated Tx CRC 614. The packet data is split into four parts that are transmitted as respective bitstreams over lanes 0-3. Under an optional implementation illustrated in FIG. 6, there is also a CRC check that is implemented for each lane, which is used to identify errant links (as depicted by CRC-L0, CRC-L1, CRC-L2, and CRC-L3). These per-lane CRC values are only calculated at the receive end.

When the packet data is received, data in the bitstreams are recombined to reform the original packet data (i.e., the data that is transmitted from transmit port 600). A received CRC value is calculated over the received packet data (Rx CRC 616) and compared with Tx CRC 614. If the values match, the packet data has been successfully transmitted without error, which is the expected result. Accordingly, process for the cycle is complete, and the transmit port proceeds to transmit the next packet in the sequence.

A replay mechanism is initiated if the Rx CRC and Tx CRC values do not match, which indicates the received packet data is errant. Accordingly, a retry request message 618 is transmitted from transmit port 600B and received at a receive port of link interface A (not shown). Depending on the implementation, the retry request message may identify the slot in the replay buffer storing the packet to be retransmitted (referred to as "replayed"), or the identification of the appropriate slot may be implicit. For example, a replay mechanism may be implemented under which both link interface A and B maintain synchronized link state information, and a receiving link interface can determine what slot in the replay buffer to identify based on the synchronized link state information.

Upon receipt of retry request message 618, replay request logic 606 will process the retry request message and identify the slot in replay buffer 607 storing the packet to be retransmitted, and that packet will be read-out from its slot in replay buffer 607 and written to Tx port buffer 610. During a subsequent cycle, the packet will be retransmitted.

As an option to using retry requests, an ACKnowledgement scheme may be implemented under which successful receipt of packets are acknowledged using ACKs. Upon receipt of an ACK, the replay buffer slot storing a copy of the packet is marked as cleared, indicating the data in that slot may be overwritten. However, it is generally preferred to employ retry requests in favor of ACKs, since the amount of bandwidth required for using ACKs is much greater than that used for retry requests (which are presumably very infrequent).

Under one embodiment, the per-lane receive-side CRC values are stored whenever an errant packet is detected. In connection with retransmission of the packet (via the replay mechanism), the per-lane receive side CRC values for the errant packet and the retransmitted packet are compared, which enables detection of an errant lane.

Generally, the use of per-lane error detection is optionally, and the use of a CRC-based error detection scheme is not meant to be limiting. Rather, any of various schemes for detecting errant packets that are known in the art may be used.

In accordance with aspects of some embodiments, the techniques and apparatus described above may be applied to interconnects between processors, referred to a socket-to-socket interconnects or links. In one embodiment, the socket-to-socket link is an Intel® Universal Path Interconnect (UPI) link. Similar link technology was previously marketed under the names QuickPath Interconnect (QPI), and Keizer Technology Interconnect) (KTI).

Figure 7:
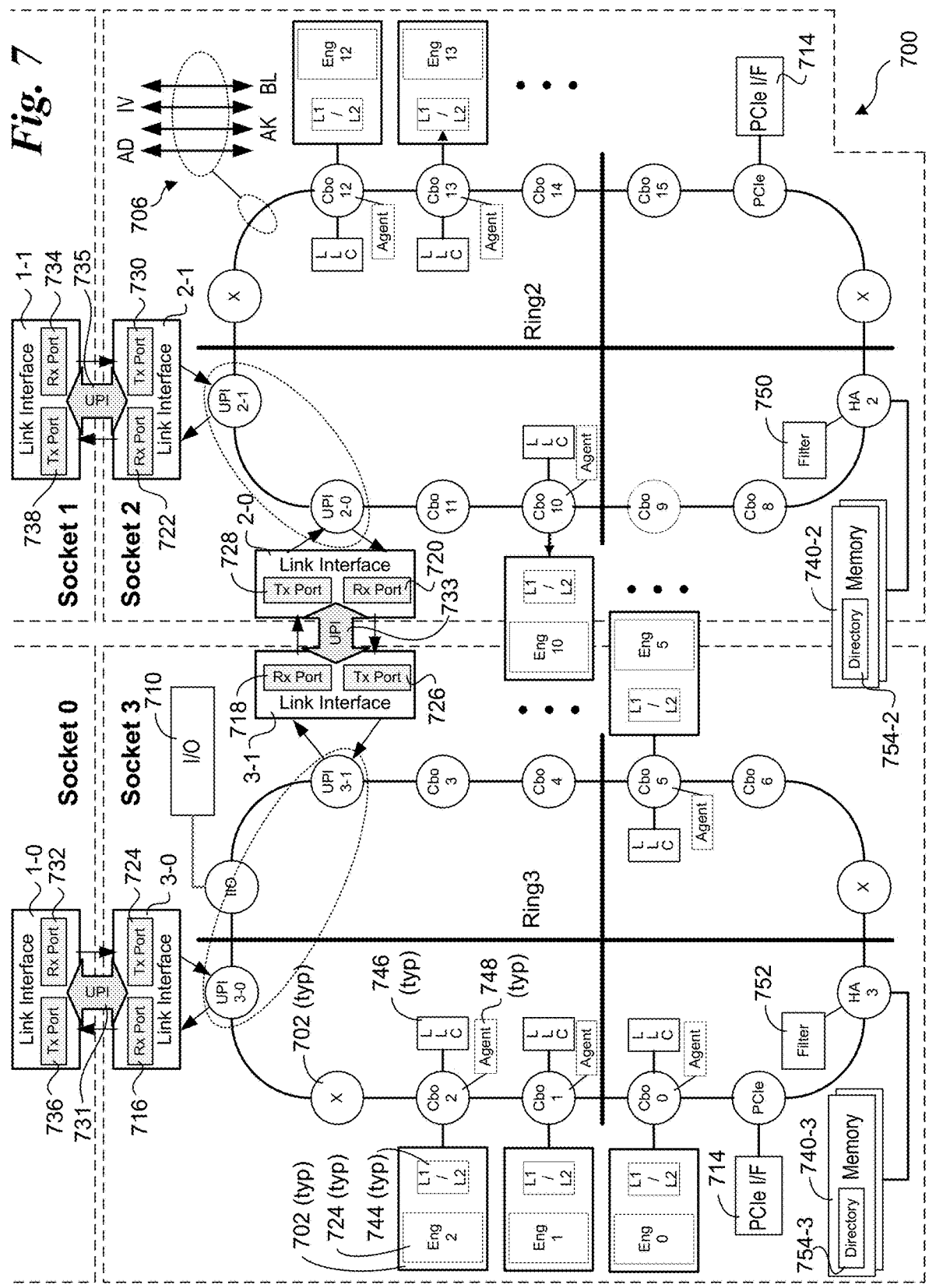
Figure 7A:
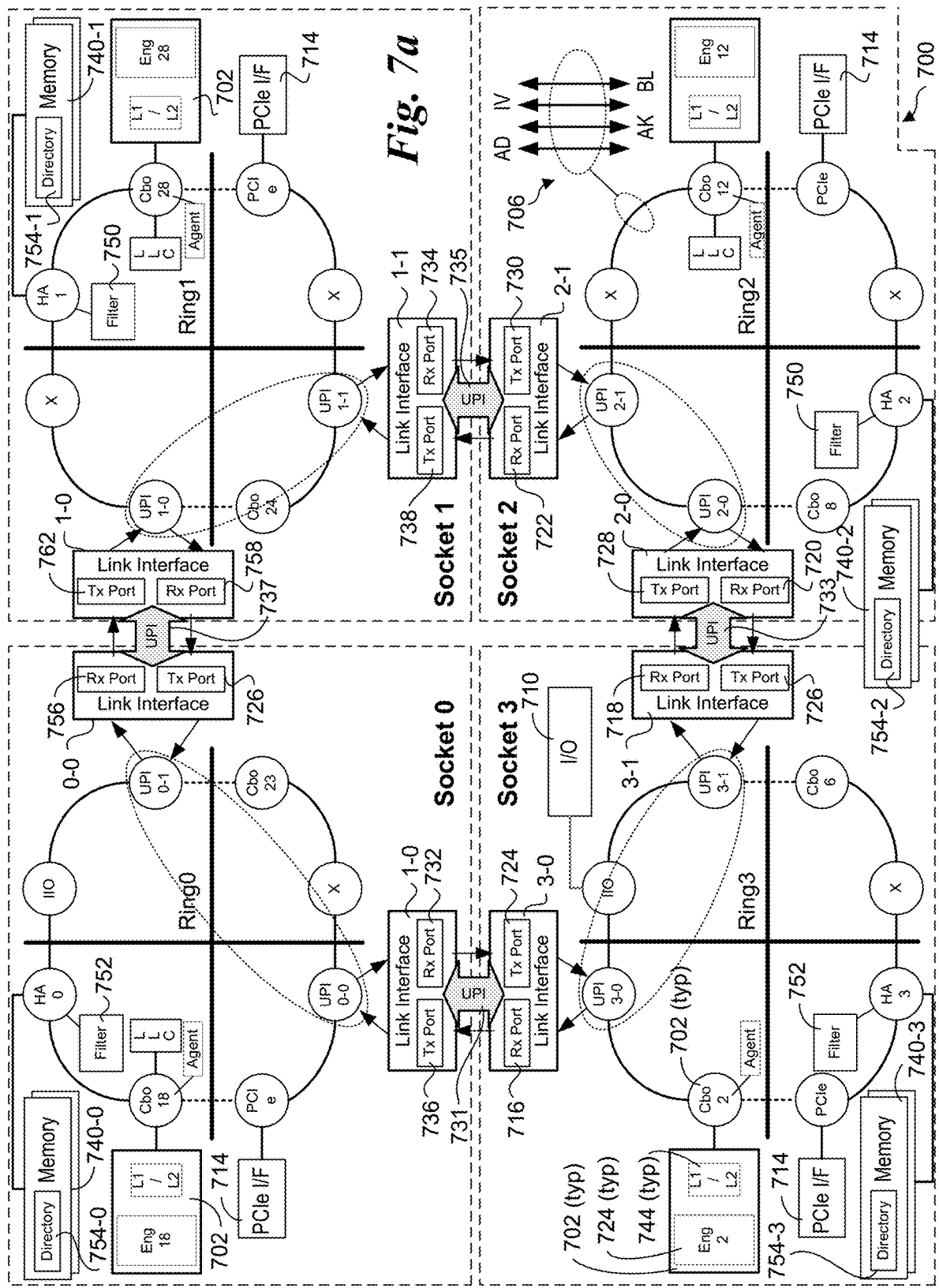

Examples of a system 700 in which UPI socket-to-socket links are implemented are shown in FIGS. 7 and 7*a*. System 700 of FIG. 7 employs of an advanced system architecture including System on a Chip (SoC) processors (CPU's) supporting multiple processor cores 702, each coupled to a respective node 704 on a ring interconnect, labeled and referred to herein as Ring2 and Ring3 (corresponding to CPU's installed in CPU sockets 2 and 3, respectfully). For simplicity, the nodes for each of the Ring3 and Ring2 interconnects are shown being connected with a single line. As shown in detail 706, in one embodiment each of these ring interconnects include four separate sets of "wires" or electronic paths connecting each node, thus forming four rings for each of Ring2 and Ring3. In actual practice, there are multiple physical electronic paths corresponding to each wire that is illustrated. It will be understood by those skilled in the art that the use of a single line to show connections herein is for simplicity and clarity, as each particular connection may employ one or more electronic paths.

In the context of system 700, a cache coherency scheme may be implemented by using independent message classes. Under one embodiment of a ring interconnect architecture, independent message classes may be implemented by employing respective wires for each message class. For example, in the aforementioned embodiment, each of Ring2 and Ring3 include four ring paths or wires, labeled and referred to herein as AD, AK, IV, and BL. Accordingly, since the messages are sent over separate physical interconnect paths, they are independent of one another from a transmission point of view.

In one embodiment, data is passed between nodes in a cyclical manner. For example, for each real or logical clock cycle (which may span one or more actual real clock cycles), data is advanced from one node to an adjacent node in the ring. In one embodiment, various signals and data may travel in both a clockwise and counterclockwise direction around the ring. In general, the nodes in Ring2 and Ring 3 may comprise buffered or unbuffered nodes. In one embodiment, at least some of the nodes in Ring2 and Ring3 are unbuffered.

Each of Ring2 and Ring3 include a plurality of nodes 204. Each node labeled Cbo n (where n is a number) is a node corresponding to a processor core sharing the same number n (as identified by the core's engine number n). There are also other types of nodes shown in system 700 including UPI nodes 3-0, 3-1, 2-0, and 2-1, an IIO (Integrated IO) node, and PCIe (Peripheral Component Interconnect Express) nodes. Each of UPI nodes 3-0, 3-1, 2-0, and 2-1 is operatively coupled to a respective UPI link interface 3-0, 3-1, 2-0, and 2-1. The IIO node is operatively coupled to an Input/Output interface 710. Similarly, PCIe nodes are operatively coupled to PCIe interfaces 712 and 714. Further shown are a number of nodes marked with an "X"; these nodes are used for timing purposes. It is noted that the UPI, IIO, PCIe and X nodes are merely exemplary of one implementation architecture, whereas other architectures may have more or less of each type of node or none at all. Moreover, other types of nodes (not shown) may also be implemented.

Each of the link interfaces 3-0, 3-1, 2-0, and 2-1 includes circuitry and logic for facilitating transfer of UPI packets between the link interfaces and the UPI nodes they are coupled to. This circuitry includes transmit ports and receive ports, which are depicted as receive ports 716, 718, 720, and 722, and transmit ports 724, 726, 728, and 730. As further illustrated, the link interfaces are configured to facilitate communication over UPI links 731, 733, and 735.

System 700 also shows two additional UPI Agents 1-0 and 1-1, each corresponding to UPI nodes on rings of CPU sockets 0 and 1 (both rings and nodes not shown). As before, each link interface includes an receive port and transmit port, shown as receive ports 732 and 734, and transmit ports 736 and 738. Further details of system 700 and a similar system 700*a* showing all four Rings0-3 are shown in FIG. 2.

In the context of maintaining cache coherence in a multi-processor (or multi-core) environment, various mechanisms are employed to assure that data does not get corrupted. For example, in system 700, each of processor cores 702 corresponding to a given CPU is provided access to a shared memory store associated with that socket, as depicted by memory stores 740-3 or 740-2, which typically will comprise one or more banks of dynamic random access memory (DRAM). For simplicity, the memory interface circuitry for facilitating connection to the shared memory store is not shown; rather, the processor cores in each of Ring2 and Ring3 are shown respectively connected to the memory store via a home agent node 2 (HA 2) and a home agent node 3 (HA 3).

As each of the processor cores executes its respective code, various memory accesses will be performed. As is well known, modern processors employ one or more levels of memory cache to store cached memory lines closer to the core, thus enabling faster access to such memory. However, this entails copying memory from the shared (i.e., main)

memory store to a local cache, meaning multiple copies of the same memory line may be present in the system. To maintain memory integrity, a cache coherency protocol is employed. Under the well-known MESI cache coherency protocol, when a processor (or core) makes a first copy of a memory line from main memory to its local cache, a mechanism is employed to mark the cache line as Exclusive (E), such that another core attempting to access the same memory line knows it does not have exclusive access to the memory line. If two or more cores have copies of the same cache line and the data in the line has not been changed (i.e., the data in the caches is the same as the line in main memory), the cache lines are in a shared (S) state. Once a change is made to the data in a local cache, the line is marked as modified (M) for that cache, and the other copies of the line are marked as Invalid (I), since they no longer reflect the changed state of data for the line. The state returns to Exclusive once the value in the modified cache line is written back to main memory.

Recently, Intel® Corporation introduced a new Forward or "F" state added to a modified MESI cache coherency protocol called the MESIF cache coherency protocol. The F state indicates that a cache should act as a designated responder for any requests for the given line. In a system of caches employing the MESI protocol, a cache line request that is received by multiple caches holding a line in the S state will receive multiple responses. In a system of caches employing the MESIF protocol, a cache line request will be responded to only by the cache holding the line in the F state.

It is noted that the MESI and MESIF protocols are examples of cache coherency protocols, and accordingly these are not to be limiting, but are used herein to explain the use of exemplary message classes that correspond to messages that are transferred around rings and across CPU sockets in accordance with the architectures disclosed herein.

It is also common to have multiple levels of caches, with caches closest to the processor core having the least latency and smallest size, and the caches further away being larger but having more latency. For example, a typical configuration might employ first and second level caches, commonly referred to as L1 and L2 caches. Another common configuration may further employ a third level or L3 cache.

In the context of system 700, the highest level cache is termed the Last Level Cache, or LLC. For example, the LLC for a given core may typically comprise an L3-type cache if L1 and L2 caches are also employed, or an L2-type cache if the only other cache is an L1 cache. Of course, this could be extended to further levels of cache, with the LLC corresponding to the last (i.e., highest) level of cache.

In the illustrated configuration of FIG. 7, each processor core 702 includes a processing engine 742 coupled to an L1 or L1/L2 cache 244, which are "private" to that core. Meanwhile, each processor core is also co-located with a "slice" of a distributed LLC 746, wherein each of the other cores has access to all of the distributed slices. Under one embodiment, the distributed LLC is physically distributed among N cores using N blocks divided by corresponding address ranges. Under this distribution scheme, all N cores communicate with all N LLC slices, using an address hash to find the "home" slice for any given address. Suitable interconnect circuitry is employed for facilitating communication between the cores and the slices; however, such circuitry is not show in FIG. 2 for simplicity and clarity.

As further illustrated, each of nodes 704 in system 700 is associated with a cache agent 748, which is configured to perform messaging relating to signal and data initiation and reception in connection with a coherent cache protocol implemented by the system, wherein each cache agent 748 handles cache-related operations corresponding to addresses mapped to its collocated LLC 746. In addition, in one embodiment each of home agents HA2 and HA3 employ respective cache filters 750 and 752, and the various caching and home agents access and update cache line usage data stored in a respective directory 754-2 and 754-3 that is implemented in a portion of shared memory 740-2 and 740-3. It will be recognized by those skilled in the art that other techniques may be used for maintaining information pertaining to cache line usage.

In accordance with one embodiment, a single UPI node may be implemented to interface to a pair of CPU socket-to-socket UPI links to facilitate a pair of UPI links to adjacent sockets. This is logically shown in FIG. 7 and other drawings herein by dashed ellipses that encompass a pair of UPI nodes within the same socket, indicating that the pair of nodes may be implemented as a single node. Accordingly, it will be understood that every drawing Figure herein that shows dashed ellipses means the pair of UPI nodes within the dashed ellipses may be implemented as a single UPI node.

FIG. 7a shows further details of the CPU's configured to be installed in CPU sockets 0 and 1, along with details of a fourth CPU socket-to-socket UPI link 124 and associated link interfaces and buffers. Various details of each of Ring2 and Ring3 have been removed (by comparison with FIG. 7) in order to show four internal ring interconnects (Ring0, Ring1, Ring2 and Ring3) in the same drawing Figure; however, it will be understood that each of Ring0 and Ring1 may have similar components as Ring2 and Ring3 depicted in FIG. 2. As before, each of Ring0 and Ring1 include nodes labeled Cbo n (such as Cbo 18 and Cbo 23 in Ring0 and Cbo 24 and 28 in Ring2) to which associated processor cores and related cache components are coupled, including L1, L2, and LLC caches with corresponding agents. Also, each of Ring0 and Ring1 include respective home agents HA 0 and HA 1 that are implemented for support coherent memory operations in the manner discussed herein.

The configuration of CPU socket-to-socket UPI link 737 is similar to the CPU socket-to-socket UPI links 731, 731, and 733 shown in FIG. 7 and discussed above. In this instance, the CPU socket-to-socket UPI link supports transfer of UPI signals between UPI node 0-1 on Ring0 and CPI node 1-0 on Ring1, as depicted by link interfaces 0-0 and 1-0, receive ports 756 and 758, and transmit ports 760 and 762.

Figure 7B:
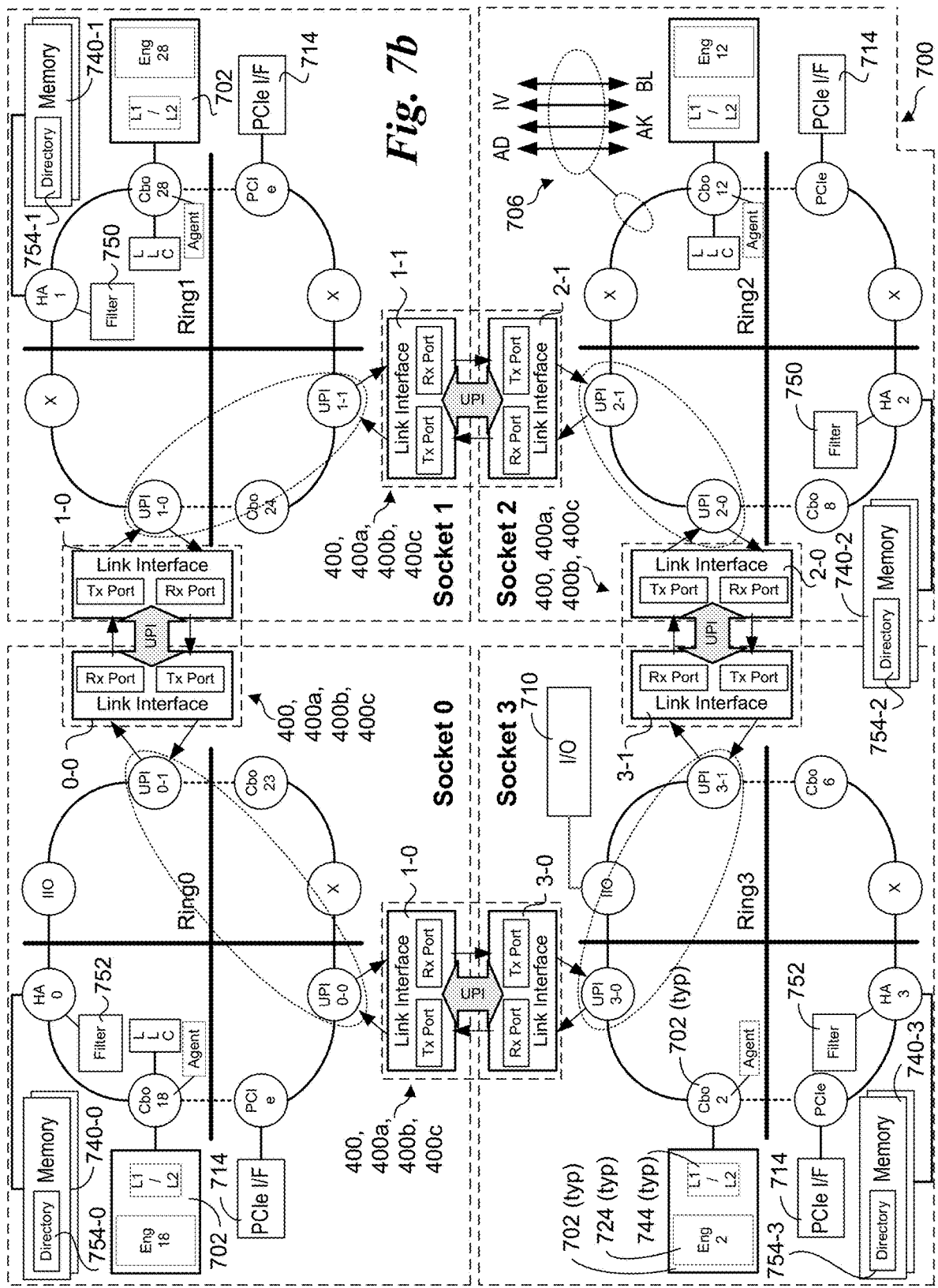

FIG. 7b shows another view of system 700 that is similar to that shown in FIG. 7a, except further annotations have been added to indicate that the UPI links and associated link interfaces may employ any of link architectures 400, 400a, 400b, and 400c shown in FIGS. 4, 4a, 4b, and 4c, respectively. Under the use context of system 700, the producers may generally be any component within a processor coupled to a ring node that produces or otherwise forward data, including processor cores, agents, IIO, and PCIe interfaces. Similarly, the receivers may generally be any component within a processor coupled to a ring node that receives data, including processor cores, agents, IIO, and PCIe interfaces.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'k', 'm', 'n', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

Various blocks depicted herein include the terminology control logic (such as Tx control logic and Rx control logic). Generally, the control logic blocks illustrated herein may be implemented using circuitry and logic configured to effect associated operations. For example, such circuitry and logic may comprise embedded logic or the like, which may be in the form of an embedded processor or microcontroller configured to execute instructions, fixed or programmable logic circuitry, such as an FPGA (Field Programmable Gate Array) or ASIC (Application Specific Integrated Circuit), or any combination of hardware and software/firmware used to effect the operations described herein. In addition, the control logic blocks are depicted as single blocks for illustrative purposes. Those skilled in the art will recognize that the actual circuitry and logic for effecting the control operations may be implemented in a distributed manner, such that respective portions of the control logic are used to effect the operations for respective components or functions, such as separate portions of control logic for implementing transmit queues, transfer of data between producers and transmit queues or transmit buffers and transmit queues, etc.

Various aspects of the embodiments herein may be facilitated by corresponding software and/or firmware components, such as software and/or firmware executed by an embedded processor or the like. Thus, embodiments of this invention may be used as or to support a software program, software modules, firmware, etc., executed upon some form of processor, processing core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

Embodiments of the present description may be implemented not only within semiconductor chip or the like, but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for transmitting data over a link coupled between a transmitter and a receiver, comprising:
    enqueuing a plurality of entries in a transmit queue in the transmitter, each entry associated with a packet or message stored in the queue or associated with a packet or message via a pointer to a packet or message stored in a buffer separate from the transmit queue;
    calculating an estimated time to transmit the packets or messages that are associated with entries currently enqueued in the transmit queue;
    determining a value of a first threshold as a function of an estimated amount of time used to compress a packet at the transmitter plus an estimated amount of time used to decompress the packet at the receiver;
    when the estimated time to transmit is greater than a first threshold,
        performing at least one of,
            (a) compressing a packet or message that is associated with an entry currently enqueued in the transmit queue; and
            (b) compressing a packet or message to be transmitted over the link prior to enqueuing an entry for the packet or message in the transmit queue.

2. The method of claim 1, further comprising:
    enqueuing an entry in the transmit queue comprising an uncompressed packet or message;
    determining whether a compression ratio for the packet or message compressed using (a) is greater or equal to a second threshold; and
    if the compression ratio is greater or equal to the second threshold,
        replacing the uncompressed packet or message in the transmit queue with the compressed packet or message; otherwise
        leaving the uncompressed packet or message in the transmit queue.

3. The method of claim 1, further comprising:
    enqueuing an entry in the transmit queue comprising a pointer to an uncompressed packet or message associated with the entry, the entry including indicia identifying the packet or message associated with the entry is uncompressed;
    compressing the uncompressed packet or message to generate a compressed packet or message;
    determining whether a compression ratio for the compressed packet or message is greater or equal to a second threshold; and
    if the compression ratio is greater or equal to the second threshold,
        updating the entry enqueued in the transmit queue by performing at least one of updating the pointer to point to a new location for the compressed packet and updating indicia in the entry to indicate the packet associated with the entry is compressed;
        otherwise, if the compression ratio is less than the second threshold,
            leaving the entry that was enqueued unchanged.

4. The method of claim 1, wherein the transmit queue includes a plurality of slots, further comprising:
    storing a compressed packet or message in the transmit queue using a first number of j slots;
    storing an uncompressed packet or message in the transmit queue using a second number of k slots;
    selecting a packet or message from the transmit queue to transmit; and
    utilizing j transmit cycles to transmit the selected packet or message if the packet or message is a compressed packet or message, otherwise
    utilizing k transmit cycles to transmit the selected packet or message if the packet or message is an uncompressed packet or message.

5. The method of claim 1, wherein the transmit queue includes a plurality of slots, further comprising:
    enqueuing entries in respective slots in the transmit queue, each entry comprising a pointer to a respective packet or message associated with the entry, the respective packet or message comprising a compressed packet or message or an uncompressed packet or message;
    selecting an entry from the transmit queue;
    using the pointer to retrieve the packet or message associated with the entry; and
    utilizing j transmit cycles to transmit the packet or message if the packet or message is a compressed packet or message, otherwise
    utilizing k transmit cycles to transmit the packet or message if the packet or message is an uncompressed packet or message.

6. The method of claim 1, wherein the transmit queue is implemented as a First-in, First-out (FIFO) queue having a plurality of slots in which packets or messages are stored, and wherein the estimated time to transmit all of the packets or messages associated with entries that are currently enqueued in the transmit queue is determined by determining a current fill level of the FIFO queue.

7. The method of claim 1, wherein data is transmitted over the link using transmit cycles, wherein the first threshold is determined as a function of a number of transmit cycles that would accrue during the estimated amount of time used to compress the packet and decompress the packet, and wherein the estimated time to transmit all of the packets or messages that are associated with entries currently enqueued in the transmit queue comprises an estimated number of transmit cycles needed to transmit all of the packets or messages that are associated with entries currently enqueued in the transmit queue.

8. The method of claim 1, wherein transmitter supports compression of packets or messages at a plurality of different compression levels, further comprising:
determining a current depth of the transmit queue; and
compressing a packet or message using a compression level selected from among the plurality of different compression levels based on the current depth of the transmit queue.

9. The method of claim 1, wherein transmitter supports compression of packets or messages at a plurality of different compression levels, further comprising:
using an integer k transmit cycles to transmit an uncompressed packet or message;
determining a compression ratio of a compressed packet or message; and
using an integer j transmit cycles to transmit the compressed packet or message, wherein j is a function of the compression ratio of the compressed packet or message and k.

10. A link interface, configured to be coupled to a peer link interface via a link, comprising:
a receiver including,
a receive buffer; and
a decompressor,
a transmitter to transmit data over the link, including,
a transmit queue;
a compressor; and
circuitry and logic to,
enqueue a plurality of entries in the transmit queue, each entry associated with a packet or message stored in the transmit queue;
calculate an estimated time to transmit the packets or messages that are associated with entries currently enqueued in the transmit queue;
when the estimated time to transmit is greater than a first threshold,
(a) compress, with the compressor, a packet or message that is associated with an entry currently enqueued in the transmit queue; or
(b) compress, with the compressor, a packet or message to be transmitted over the link prior to enqueuing an entry for the packet or message in the transmit queue,
wherein data is transmitted over the link using transmit cycles, wherein the first threshold comprises a number of transmit cycles that would accrue during an estimated amount of time used to compress the packet at the transmitter and decompress the packet at a receiver of the peer link interface, and wherein the estimated time to transmit the packets or messages that are associated with entries currently enqueued in the transmit queue comprises an estimated number of transmit cycles needed to transmit the packets or messages that are currently enqueued in the transmit queue.

11. The link interface of claim 10, wherein the transmitter circuitry and logic is further to:
enqueue an entry in the transmit queue comprising an uncompressed packet or message along with indicia identifying the entry is associated with a packet or message that is uncompressed;
determine whether a compression ratio for the packet or message compressed using (a) is greater or equal to a second threshold; and
if the compression ratio is greater or equal to the second threshold,
replace the uncompressed packet or message in the transmit queue with the compressed packet or message and update the indicia in the entry to identify the packet or message associated with the entry is a compressed packet or message; otherwise
leave the entry in the transmit queue.

12. The link interface of claim 10, wherein the transmitter circuitry and logic is further to:
determine whether a compression ratio for the packet or message compressed using (b) is greater or equal to a second threshold; and
if the compression ratio is greater or equal to the second threshold,
enqueue the compressed packet or message in the transmit queue as a new entry that further includes indicia indicating the entry corresponds to a compressed packet or message; otherwise
enqueue the uncompressed packet or message in the transmit queue as a new entry that further includes indicia indicating the entry corresponds to an uncompressed packet or message.

13. The link interface of claim 10, wherein the transmit queue includes a plurality of slots, and wherein the transmitter circuitry and logic is further to:
store a compressed packet or message in the transmit queue using a first number of j slots;
store an uncompressed packet or message in the transmit queue using a second number of k slots;
select a packet or message from the transmit queue to transmit; and
utilize j transmit cycles to transmit the selected packet or message if the packet or message is a compressed packet or message, otherwise
utilize k transmit cycles to transmit the selected packet or message if the packet or message is an uncompressed packet or message.

14. The link interface of claim 10, wherein the transmit queue is implemented as a First-in, First-out (FIFO) queue having a plurality of slots in which packets or messages are stored, and wherein the estimated time to transmit all of the packets or messages associated with entries that are currently enqueued in the transmit queue is determined by determining a current fill level of the FIFO queue.

15. The link interface of claim 10, further comprising a replay buffer, and further circuitry and logic to:
dequeue packets or messages to be transmitted to the link peer over the link;
buffer copies of the packets or messages that are dequeued in the replay buffer;
receive, at the receiver, a packet or message indicating a packet or message received by the peer link interface was errant; and, in response thereto,
identify the copy of the packet or message in the replay buffer corresponding to the received packet or message that was errant; and
retransmit the copy of the packet or message that is identified over the link.

16. The link interface of claim 10, wherein the receiver includes circuitry and logic to:
buffer data received from the peer link interface in the receive buffer, the data that is received comprising data corresponding to compressed packets and uncompressed packets;
detect data in the receive buffer corresponding to compressed packets; and decompress the data corresponding to the compressed packets with the decompressor to generate uncompressed packets.

17. The link interface of claim 10, wherein compressor supports compression of packets or messages at a plurality of different compression levels, and wherein the transmitter includes circuitry and logic to:
determine a current depth of the transmit queue; and
compress a packet or message using a compression level selected from among the plurality of different compression levels based on the current depth of the transmit queue.

18. The link interface of claim 10, wherein compressor supports compression of packets or messages at a plurality of different compression levels, and wherein the transmitter includes circuitry and logic to:
use an integer k transmit cycles to transmit an uncompressed packet or message;
determine a compression ratio of a compressed packet or message; and
use an integer j transmit cycles to transmit the compressed packet or message, wherein j is a function of the compression ratio of the compressed packet or message and k.

19. A processor, configured to be installed in a socket of a multi-socket system comprising:
a plurality of processor cores, interconnected by interconnect circuitry;
a socket-to-socket link interface, coupled to the plurality of processor cores via the interconnect circuitry and configured to be coupled to a peer socket-to-socket link interface of another processor of the multi-socket system via a socket-to-socket link when the processor is installed in the multi-socket system, the socket-to-socket link interface comprising,
a receiver including,
a receive buffer; and
a decompressor,
a transmitter to transmit data over the link, including,
a transmit queue;
a compressor; and
circuitry and logic to,
enqueue a plurality of entries in the transmit queue, each entry associated with a packet or message stored in the transmit queue;
calculate an estimated time to transmit the packets or messages that are associated with entries currently enqueued in the transmit queue;
when the estimated time to transmit is greater than a first threshold,
(a) compress, with the compressor, a packet or message that is associated with an entry currently enqueued in the transmit queue; or
(b) compress, with the compressor, a packet or message to be transmitted over the link prior to enqueuing an entry for the packet or message in the transmit queue,
wherein data is transmitted over the link using transmit cycles, wherein the first threshold comprises a number of transmit cycles that would accrue during an estimated amount of time used to compress the packet at the transmitter and decompress the packet at a receiver of the peer link interface, and wherein the estimated time to transmit the packets or messages that are associated with entries currently enqueued in the transmit queue comprises an estimated number of transmit cycles needed to transmit the packets or messages that are currently enqueued in the transmit queue.

20. The processor of claim 19, wherein the transmitter circuitry and logic is further to:
enqueue an entry in the transmit queue comprising an uncompressed packet or message along with indicia identifying the entry is associated with a packet or message that is uncompressed;
determine whether a compression ratio for the packet or message compressed using (a) is greater or equal to a second threshold; and
if the compression ratio is greater or equal to the second threshold,
replace the uncompressed packet or message in the transmit queue with the compressed packet or message and update the indicia in the entry to identify the packet or message associated with the entry is a compressed packet or message; otherwise
leave the entry in the transmit queue.

21. The processor of claim 19, wherein the transmitter circuitry and logic is further to:
determine whether a compression ratio for the packet or message compressed using (b) is greater or equal to a second threshold; and
if the compression ratio is greater or equal to the second threshold,
enqueue the compressed packet or message in the transmit queue as a new entry that further includes indicia indicating the entry corresponds to a compressed packet or message; otherwise
enqueue the uncompressed packet or message in the transmit queue as a new entry that further includes indicia indicating the entry corresponds to an uncompressed packet or message.

22. The processor of claim 19, wherein the transmit queue includes a plurality of slots, and wherein the transmitter circuitry and logic is further to:
store a compressed packet or message in the transmit queue using a first number of j slots;
store an uncompressed packet or message in the transmit queue using a second number of k slots;
select a packet or message from the transmit queue to transmit; and
utilize j transmit cycles to transmit the selected packet or message if the packet or message is a compressed packet or message, otherwise
utilize k transmit cycles to transmit the selected packet or message if the packet or message is an uncompressed packet or message.

23. The processor of claim 19, wherein the transmit queue is implemented as a First-in, First-out (FIFO) queue having a plurality of slots in which packets or messages are stored, and wherein the estimated time to transmit all of the packets or messages associated with entries that are currently enqueued in the transmit queue is determined by determining a current fill level of the FIFO queue.

24. The processor of claim 19, wherein the socket-to-socket link interface further comprises a replay buffer and further circuitry and logic to:
dequeue packets or messages to be transmitted to the link peer over the link;
buffer copies of the packets or messages that are dequeued in the replay buffer;
receive, at the receiver, a packet or message indicating a packet or message received by the peer link interface was errant; and, in response thereto, identify the copy of the packet or message in the replay buffer corresponding to the received packet or message that was errant; and retransmit the copy of the packet or message that is identified over the link.

25. The processor of claim 19, wherein the receiver includes circuitry and logic to:

buffer data received from another processor over the socket-to-socket link in the receive buffer, the data that is received comprising data corresponding to compressed packets and uncompressed packets;

detect data in the receive buffer corresponding to compressed packets; and decompress the data corresponding to the compressed packets with the decompressor to generate uncompressed packets.

26. The processor of claim 19, wherein the interconnect circuitry includes a ring interconnect including a plurality of nodes, wherein each processor core and the socket-to-socket is coupled to a respective node on the ring interconnect.

27. The processor of claim 19, wherein the compressor supports compression of packets or messages at a plurality of different compression levels, and wherein the transmitter includes circuitry and logic to:

determine a current depth of the transmit queue; and compress a packet or message using a compression level selected from among the plurality of different compression levels based on the current depth of the transmit queue.

* * * * *